US008761984B2

(12) United States Patent
Yates et al.

(10) Patent No.: US 8,761,984 B2
(45) Date of Patent: Jun. 24, 2014

(54) FRONT WHEEL ENERGY RECOVERY SYSTEM

(71) Applicant: W. Morrison Consulting Group, Inc., Aliso Viejo, CA (US)

(72) Inventors: William M. Yates, Aliso Viejo, CA (US); Benjamin T. Ingram, Tustin, CA (US)

(73) Assignee: W.Morrison Consulting Group Inc., Aliso Viejo, CA (US)

( * ) Notice: Subject to any disclaimer, the term of this patent is extended or adjusted under 35 U.S.C. 154(b) by 0 days.

(21) Appl. No.: 13/838,989

(22) Filed: Mar. 15, 2013

(65) Prior Publication Data

US 2013/0226381 A1  Aug. 29, 2013

Related U.S. Application Data

(63) Continuation of application No. 12/897,534, filed on Oct. 4, 2010.

(51) Int. Cl.
*B60L 11/00* (2006.01)

(52) U.S. Cl.
USPC .......................... 701/22; 180/65.31; 180/65.6

(58) Field of Classification Search
USPC ............. 701/22, 36; 180/65.1, 65.21, 65.245, 180/65.265, 65.31, 65.51; 310/67 A, 67 R, 310/83, 87, 112, 113, 114
See application file for complete search history.

(56) References Cited

U.S. PATENT DOCUMENTS

| 3,024,860 A | 3/1962 | Nicolai |
| 3,045,772 A | 7/1962 | Nicolai |
| 3,199,623 A | 8/1965 | Mangum |
| 3,934,669 A | 1/1976 | Adams |
| 3,939,932 A | 2/1976 | Rosen |

(Continued)

FOREIGN PATENT DOCUMENTS

| CN | 101525024 A | 9/2009 |
| DE | 202005013929 U1 | 12/2005 |

(Continued)

OTHER PUBLICATIONS

Christini All Wheel Drive Motorcycles Service Manual, Christini Technologies, Inc., 84 pages; 2007.

(Continued)

*Primary Examiner* — Richard Camby
(74) *Attorney, Agent, or Firm* — Mckenna Long & Aldridge, LLP

(57) ABSTRACT

A kinetic energy recovery system ("KERS system") and motorcycle equipped with the same is disclosed. The KERS system may be mechanical, hydraulic, or a combination thereof. In an embodiment, motorcycle includes a rear wheel, an electric motor, a motor shaft, and a front wheel equipped with a wheel hub that includes a sprag clutch. The motor shaft can be fitted with a motor drive sprocket that drives a jackshaft chain that in turn drives a jackshaft input sprocket that is fitted to the jackshaft. Jackshaft input sprocket may be installed in conjunction with a sprag clutch that allows the rear wheel to free wheel during coasting while the front wheel KERS system is engaged. The motor harvests kinetic energy from the front wheel without simultaneously powering the rear wheel while the use of a geared dead zone allows the front and rear wheels to not lock together to improve safety.

33 Claims, 25 Drawing Sheets

(56) References Cited

U.S. PATENT DOCUMENTS

| | | |
|---|---|---|
| 4,397,369 A | 8/1983 | Read |
| 4,479,660 A | 10/1984 | Pattison |
| 5,042,608 A | 8/1991 | Horiike et al. |
| 5,050,699 A | 9/1991 | Savard |
| 5,052,705 A | 10/1991 | Ringle |
| 5,054,572 A | 10/1991 | Parker |
| 5,113,964 A | 5/1992 | Yamauchi |
| 5,253,889 A | 10/1993 | Kaminski |
| 5,324,057 A | 6/1994 | Chartrand |
| 5,491,390 A | 2/1996 | McGreen |
| 5,644,202 A | 7/1997 | Toriyama et al. |
| 5,671,821 A | 9/1997 | McGreen |
| 5,865,267 A | 2/1999 | Mayer et al. |
| 5,873,428 A | 2/1999 | Ohshita et al. |
| 5,894,903 A | 4/1999 | Hieble |
| 6,039,137 A | 3/2000 | Schless |
| 6,068,279 A | 5/2000 | Dion |
| 6,158,543 A | 12/2000 | Matsuto et al. |
| 6,161,854 A | 12/2000 | Christini et al. |
| 6,161,855 A | 12/2000 | Christini et al. |
| 6,182,991 B1 | 2/2001 | Christini et al. |
| 6,196,347 B1 * | 3/2001 | Chao et al. ............ 180/206.2 |
| 6,398,683 B1 | 6/2002 | Fukuda |
| 6,439,592 B1 | 8/2002 | Christini et al. |
| 6,446,985 B1 | 9/2002 | Tompsett |
| 6,505,699 B1 | 1/2003 | Christini et al. |
| 6,663,524 B2 | 12/2003 | Gu et al. |
| 6,724,165 B2 | 4/2004 | Hughes |
| 6,833,642 B1 | 12/2004 | Hung |
| 6,888,273 B2 * | 5/2005 | Hughes et al. ............ 310/78 |
| 7,231,998 B1 | 6/2007 | Schechter |
| 7,290,629 B2 | 11/2007 | Ozeki et al. |
| 7,328,766 B2 | 2/2008 | Christini et al. |
| 7,487,854 B2 | 2/2009 | Christini et al. |
| 7,570,012 B2 | 8/2009 | Dasgupta et al. |
| 7,775,314 B2 | 8/2010 | Blais et al. |
| 8,042,641 B2 | 10/2011 | Lawson |
| 8,056,693 B2 | 11/2011 | Christini et al. |
| 8,151,919 B2 | 4/2012 | Chen et al. |
| 8,225,897 B1 | 7/2012 | Hollingsworth |
| 8,413,748 B2 * | 4/2013 | Nishikawa et al. ........ 180/65.51 |
| 2003/0169002 A1 * | 9/2003 | Hughes ............ 318/376 |
| 2004/0134696 A1 | 7/2004 | Esposito et al. |
| 2005/0173176 A1 | 8/2005 | Christini et al. |
| 2007/0169973 A1 | 7/2007 | Masut et al. |
| 2007/0235235 A1 | 10/2007 | Fukami et al. |
| 2008/0066984 A1 | 3/2008 | Holland |
| 2008/0100027 A1 | 5/2008 | Christini et al. |
| 2008/0234933 A1 | 9/2008 | Chowdhary et al. |
| 2009/0188738 A1 | 7/2009 | Christini et al. |
| 2010/0018787 A1 | 1/2010 | Plazotta |
| 2010/0236849 A1 | 9/2010 | Wishart |
| 2010/0243349 A1 | 9/2010 | Nomura et al. |
| 2010/0243350 A1 | 9/2010 | Nishikawa |
| 2011/0036656 A1 | 2/2011 | Nicoson |
| 2011/0162900 A1 | 7/2011 | Chen et al. |
| 2011/0231041 A1 | 9/2011 | Kim et al. |
| 2011/0231060 A1 | 9/2011 | Kim et al. |
| 2011/0231085 A1 | 9/2011 | Kim et al. |
| 2011/0291462 A1 | 12/2011 | Meyers |
| 2011/0292667 A1 | 12/2011 | Meyers |
| 2011/0295452 A1 | 12/2011 | Meyers |
| 2011/0295454 A1 | 12/2011 | Meyers |
| 2012/0052995 A1 * | 3/2012 | Scarbo et al. ............ 474/86 |
| 2012/0065825 A1 | 3/2012 | Nicoson |
| 2012/0109483 A1 | 5/2012 | O'Dea et al. |
| 2012/0184379 A1 | 7/2012 | Christini et al. |
| 2012/0211291 A1 | 8/2012 | Black |

FOREIGN PATENT DOCUMENTS

| | | |
|---|---|---|
| EP | 798202 | 10/1997 |
| JP | 04151390 A | 10/1990 |
| JP | 05085444 A | 5/1992 |
| JP | 05085437 A | 4/1993 |
| JP | 05085438 A | 4/1993 |
| JP | 05085439 A | 4/1993 |
| JP | 05085441 A | 4/1993 |
| JP | 05085443 A | 4/1993 |
| JP | 08262971 A | 10/1996 |
| JP | 2004210072 | 7/2004 |
| JP | 2009161026 A | 7/2009 |
| WO | 9011218 A1 | 10/1990 |
| WO | 0058121 A | 10/2000 |
| WO | 2005044602 A | 5/2005 |

OTHER PUBLICATIONS

Chip Yates, The World's Most Powerful Electric Superbike—194 hp! Specification; 2010.

Chip Yates, On Board Acquisition to Lower Lap Times and Improve Set Up, Road Racing World & Motorcycle Technology, vol. 20, No. 3, pp. 20-24, Mar. 2010.

Chip Yates, Building An Electric Superbike, Road Racing World & Motorcycle Technology, vol. 20, No. 6, Jun. 2010.

Chip Yates, Why Electric Racebikes Can Work, Road Racing World & Motorcycle Technology, vol. 20, No. 4, pp. 40-43, Apr. 2010.

Chip Yates, Building An Electric Superbike, Road Racing World & Motorcycle Technology, vol. 20, No. 5, May 2010, pp. 44-45 and p. 51.

* cited by examiner

FRONT WHEEL
HYDRAULIC PUMP

SPROCKET TO DRIVE
JACKSHAFT / REAR WHEEL

ELECTRIC MOTOR

HYDRAULIC PUMP / MOTOR

FRONT WHEEL ENERGY RECOVERY SYSTEM

This application is a continuation of U.S. patent application Ser. No. 12/897,534, filed Oct. 4, 2010, which is incorporated by reference for all purposes in its entity as if fully set forth herein.

BACKGROUND OF THE INVENTION

1. Field of the Invention

The present invention relates to a system and method for energy recovery using the front wheel of a vehicle.

2. Discussion of the Related Art

Electric and hybrid powered vehicles offer a means of transportation that emit substantially no pollutants and produce little noise. These features are especially important at a time when such pollution has become a major concern. Although major advances have been made in electric and hybrid powered automobiles, the same cannot be said for two-wheeled and three-wheeled vehicles such as motorcycles, scooters, mopeds, and trikes, hereinafter referred to as "motorcycle(s)".

Motorcycles have a wide variety of uses and the potential to positively impact society and the environment through reduction of congestion and pollution in addition to other benefits arising from their propagation. Gasoline burning versions of these vehicles are used for recreational purposes, as a main means for transportation in every day use, and even in competitive racing. One major concern with using electric motors in vehicle design is battery life and battery size, which impact vehicle power and range, especially on motorcycles where space to accommodate batteries is extremely limited.

Electric and hybrid powered vehicles rely on electricity from an on-board electricity storage source such as a battery, capacitor, or combination of both (hereinafter "electrical accumulator"). The most common electrical accumulator in use today is a battery, which must be recharged periodically, either during or after use. The most common means for recharging an electric vehicle's battery is by plugging it into an AC power outlet for a long period of time. For hybrid vehicles, charging may occur during use from power delivered by an on-board internal combustion engine. Battery size becomes a key issue as consumers are demanding that electric vehicles operate at extended ranges that require larger and thus heavier batteries that are more costly and are not conducive to small vehicles such as motorcycles.

For these and other reasons, historically motorcycles have involved the use of only gasoline powered internal combustion engines. These vehicles have generally been gasoline powered because they can be quickly refilled from ubiquitous filling stations, can generate substantial power for their weight, and are relatively inexpensive. Today's battery technology does not provide for long duration sufficient to make an electric two or three-wheeled vehicle competitive with its gasoline powered counterparts, and so manufacturers have been slow to produce electric motorcycles. These drawbacks, however, can be rectified by a system that is capable of producing substantial regeneration of the battery during use, such as during regenerative braking events, in order to recharge the battery and extend vehicle range for greater performance and consumer acceptance.

One approach to providing regeneration of a battery during use is by the use of a kinetic energy recovery system ("KERS system"), which is also known as a regenerative braking system or energy recovery system. Kinetic energy recovery has been developed for electrically powered four-wheel production and race vehicles, but the systems developed for four-wheel vehicles (hereinafter "cars") are not able to be effectively utilized in motorcycles due to issues relating to size, weight, vehicle stability, and for additional and non-obvious reasons.

One way to construct a KERS system that is known in the art is to utilize a "wheel motor", which is an electric motor installed inside the structure of one or more of a vehicle's wheels. A wheel motor provides regenerative braking torque that can be used to charge an on-board battery. One fundamental problem of wheel motors is they must be of a large enough capacity to harvest a meaningful amount of energy sufficient to justify their weight and cost. In one example analysis performed by the inventors, a racing motorcycle was instrumented with a data acquisition system and it was discovered that during heavy braking, an amount of energy equivalent to 150 horsepower was being converted to heat by the traditional friction braking system installed on the front wheel. To capture this energy for use in battery charging would require a 150 horsepower wheel motor to be installed inside the front wheel, which would weigh more than 100 lbs and be extremely expensive. Additionally, the effect of adding more than 100 lbs to the front wheel of a motorcycle would create an extremely unstable and dangerous vehicle dynamics situation, since steering, balance, wheel size, and unsprung weight are all degraded considerably, assuming the bulky 150 horsepower motor could even be packaged inside a front wheel in the first place. Accordingly, there is a need for a system with the lightest possible components located at the front wheel that can transmit significant energy away from the front wheel to be converted to electricity by a generating device located separately from the front wheel, such as inside the frame of the motorcycle.

The negative effects that wheel motors present to motorcycles can be partially mitigated in electric or hybrid cars. Typically, cars steer by using the two front wheels, giving more steering stability than the one-wheel steering found on motorcycles. Cars do not have to lean during cornering and being larger, weight is not as much of a concern for cars as it is for motorcycles, which rely on being nimble for safe handling especially during cornering on windy roads. During braking, cars spread the traction and heat rejection work over four wheels, and the rear wheels of a car typically handle more braking effort than does the rear wheel of a motorcycle. In one example, the braking proportion of a car may be 70% front wheels and 30% rear wheels. For a motorcycle, the braking loads may be more like 90% front and 10% rear, and it is not uncommon for the rear wheel to actually lift off of the pavement during heavy braking, which means the front wheel is handling 100% of the braking.

Cars may be designed with electric motors driving some or all of the wheels; either by the use of wheel motors inside the actual wheels, or by the mechanical coupling of a motor to a driven wheel. Whenever a motor is coupled to drive a particular wheel, it is convenient to use that same motor for regeneration simply by configuring the motor controller for that motor to initiate regenerative braking torque rather than forward propulsion torque with little or no additional structure required. A very large percentage of electric and hybrid cars available today use a front wheel drive powertrain, which greatly facilitates the use of regenerative braking in such vehicles. Yet despite the steady increase of manufacturer interest in electric cars and the ease with which they may deploy a KERS system on their front wheel drive designs, electric motorcycles are extremely rare, and almost none of those that have been built use any kind of regenerative braking systems. This is because conventional wisdom in the field of electric motorcycles holds that since the electric motor is mechanically coupled to drive the rear wheel (where there is little regenerative benefit under braking due to the light loading of the rear wheel as previously discussed) such systems are ineffective on a motorcycle. Research and analysis conducted by the inventors on the effectiveness of rear wheel KERS systems indicate that such a configuration can be expected to produce no more than 1 C of charge current in the best case scenario, whereas embodiments in accordance with the present invention can deliver more than 10 times that amount through the collection of energy from the front, non-driven wheel. To the knowledge of the inventors of this application, no one in the art of electric motorcycle design has even recognized and certainly not addressed the problem of how to recover the abundant energy available from the front wheel of a motorcycle under braking, which is otherwise wasted as heat. Another factor that has caused the electric motorcycle industry to ignore KERS systems is the very high crash danger arising from the use of rear wheel regeneration because applying any braking torque to a lightly loaded rear wheel, especially when leaning into a turn, easily locks up the wheel and causes rapid loss of traction and control.

Other KERS system constructions may be used such as via hydraulic accumulators or flywheel storage, but like wheel motors, each have drawbacks that render them inappropriate for motorcycle applications. Companies such as Eaton Corporation have successfully implemented KERS systems known by their trademark as Hydraulic Launch Assist ("HLA®") for heavy commercial vehicles such as garbage trucks. During braking, a hydraulic pump/motor coupled to the drivetrain creates hydraulic pressure inside a large hydraulic accumulator that acts to compress a gas such as nitrogen. This stored pressure is later released as a fairly short burst during acceleration back to the hydraulic pump/motor and is known to improve the efficiency of such vehicles. The use of a high pressure accumulator sufficient to provide a meaningful KERS system benefit on a motorcycle, coupled with the inefficiencies inherent in this type of accumulator system make it impractical for a motorcycle. Similarly, the storage of braking energy in a flywheel has been successfully implemented by Porsche AG in their 911 GT3 R Hybrid racecar. Using a 40,000 RPM flywheel provided by Williams F1 and two 80 horsepower electric motors, Porsche has reported their KERS system equipped racecar delivering an average of 6.2 mpg during race conditions versus 5.6 mpg for their non-KERS system equipped racecar at the Nurburgring race track in April, 2010. While this is a noteworthy improvement in fuel economy, the packaging and handling impact on a motorcycle with a 40,000 RPM flywheel mounted to it combined with the extreme cost, cooling requirements, and limited energy storage make flywheels impractical for motorcycles.

The use of a mechanical or hydraulic (non-accumulator hydraulic system) energy transfer system holds promise as the basis of an effective KERS system solution for a motorcycle so long as certain precautions are taken with respect to safety and vehicle dynamics. The application of gears, shafts, pumps and other such structures to the front wheel and suspension of a motorcycle presents a number of challenges as it is easy to upset the safe handling characteristics of a two or three-wheeled vehicle, which are more sensitive to such changes than are cars. Even with the safe design and installation of a mechanical or hydraulic KERS system, safety and vehicle dynamics are dependent on the careful actuation and precise control of the system during operation as disclosed in more detail herein below.

One recent development in the area of using mechanical gears and shafts on a dirt bike or bicycle are described in U.S. Pat. No. 6,505,699, and related U.S. Patent Application Publication No. 2009/0188738 and U.S. Pat. Nos. 6,439,592; 6,182,991; 6,161,854; 7,487,854; 7,328,766; and 6,161,855 issued to Steven J. Christini, et al. all of which are incorporated by reference herein. The system described in U.S. Pat. No. 6,505,699 is designed to transfer a limited percentage of available power from a standard gasoline burning internal combustion engine to the front wheel of a dirt bike at certain times during operation. In doing so, Christini has achieved a dirtbike that may be operated in either standard rear-wheel drive or in a two-wheel drive mode, as manually determined from a rider-operated lever, depending on available traction in the dirt. U.S. Pat. No. 6,505,699 does not disclose or provide any teaching on recovering energy from the front wheel for use in recharging batteries or for any other purpose, and actually precludes such energy transfer by the teaching of one-way freewheel sprag clutches in the front wheel that operate to allow the motor to drive the front wheel but do not allow the front wheel to back drive the motor for regeneration. Additionally, U.S. Pat. No. 6,505,699 does not even disclose implementation in an electric powered vehicle.

It is clear that manufacturers and inventors of electric motorcycles have failed to recognize and address the problem of recovering kinetic energy from the front wheel. Limited efforts have been made to implement rear wheel KERS systems, but the poor regeneration provided by the lightly loaded rear tire have led most to abandon the pursuit of on-board recharging altogether. Industry experts have been quoted as saying that KERS systems on a motorcycle are a waste of time. KTM Power Sports AG is one company to try rear wheel KERS system on a motorcycle. KTM is a well known manufacturer of motorcycles and also endeavors to race their motorcycles in various events around the world. KTM has substantial engineering and financial resources. KTM reported using a rear wheel KERS system in the 2008 Valencia Grand Prix race on a 125 cc two-stroke motorcycle that generated an additional 2.68 horsepower and was subsequently banned by race organizers.

Unfortunately, the limited battery capacities available in the current state of the art combined with the industry's failure to recognize or employ the front wheel as a source of significant recharging energy, has combined to relegate the fledgling electric motorcycle industry to novelty status with an uncertain future due to limited vehicle range and performance.

Accordingly, there is an urgent need for a regenerative braking system that can capture significant energy from the front wheel of a motorcycle, that is also lightweight, efficient in its energy transfer, easy to package, cost effective, and does not impede the maneuverability or safety of the KERS system equipped motorcycle.

SUMMARY OF THE INVENTION

One embodiment of a front wheel kinetic recovery system for a motorcycle made in accordance with the claimed invention substantially obviates the limitations and disadvantages of the related art.

An advantage of an embodiment of the claimed front wheel KERS system for a motorcycle may be to provide a mechanical system with counterbalanced torque reactions and moments of inertia for the portion of the KERS system that is co-located with the front wheel and suspension so as to avoid creating a torque steering effect. This in turn improves the vehicle dynamics and safety for the rider.

Another advantage of an embodiment of the claimed front wheel KERS system for a motorcycle may be the ability to easily install a hydraulic version of the claimed invention to a new or existing motorcycle with minimal modifications.

Another advantage of an embodiment of the claimed front wheel KERS system for a motorcycle may be the ability to transmit substantial energy from the front wheel to an electricity generating device located separately from the front wheel without interfering with steering range of motion or the telescoping action of the front suspension.

Another advantage of an embodiment of the claimed front wheel KERS system for a motorcycle may be the ability to transfer substantial energy from the front wheel to extend the life of the on-board electrical accumulator charge and thus allow for the use of more powerful motors with smaller battery packs that would otherwise be quickly discharged.

Another advantage of an embodiment of the claimed front wheel KERS system for a motorcycle may be the ability to transfer substantial energy from the front wheel to extend the life of the electrical accumulator charge and thus allow for a motorcycle with a fixed capacity motor and electrical accumulator to travel over an extended range relative to a non-KERS system equipped motorcycle of the same capacity motor and electrical accumulator.

Another advantage of an embodiment of the claimed front wheel KERS system for a motorcycle may be to provide a system that allows for comprehensive control over the KERS system both by manual and/or automatic controls.

Additional features and advantages of the invention will be set forth in the description which follows, and in part will be apparent from the description, or may be learned by practice of the invention. The objectives and other advantages of the invention may be realized and attained by the exemplary structure particularly pointed out in the written description and claims hereof as well as the appended drawings.

To achieve these and other advantages and in accordance with the purpose of exemplary embodiments, as embodied and broadly described; a vehicle powered at least partially by at least one electric motor comprising an electrical accumulator to store and provide electricity to the at least one electric motor; a front wheel and at least one rear wheel; a handlebar; a front wheel kinetic energy recovery system operating to transmit energy from said front wheel to an electricity generating device located separately from said front wheel; whereby electricity may be transmitted from said electricity generating device to said electrical accumulator during vehicle operation.

In another aspect of exemplary embodiments a method of regenerating energy in an electrical accumulator comprising: operatively connecting a kinetic energy recovery system to a front wheel of a two-wheel or three-wheel vehicle; transferring energy collected from the front wheel to an electric motor by applying a load on a motor shaft; controlling the motor to generate electricity using the load applied on the motor shaft.

In another aspect of exemplary embodiments, a method of determining the suitability of an electrical accumulator for use with a front wheel kinetic energy recovery system comprising: calculating an amount of KERS system charge current obtainable from the front wheel kinetic energy recovery system; calculating a current level and duration for a desired duty cycle for an electrical accumulator for at least one discharge event and one energy recovery event; and testing the electrical accumulator using the calculated current level and duration from each event.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to various embodiments, examples of which are illustrated in the accompanying drawings.

Embodiments relate to a kinetic energy recovery system and a motorcycle equipped with the same. It should be noted that for simplicity, the following paragraphs discuss embodiments relating to a motorcycle. This should not be viewed as limiting however, as the described KERS systems are designed for application with any two-wheeled or three-wheeled motorcycle and other vehicle. Accordingly, in addition to any type of motorcycle, the KERS systems described may also be applied to scooters, mopeds, and other two-wheel or three-wheel motorized bikes or trikes.

The energy recovery system according to exemplary embodiments may comprise a mechanical system, a hydraulic system, or a combination thereof. The mechanical system will be referred to as the mechanical KERS system. The hydraulic system will be referred to as the hydraulic KERS system.

Exemplary embodiments may include a front wheel system with certain gears and drive shafts located to convey energy starting at the front wheel drive hub utilizing a sprag clutch, traveling along the front forks, inside the lower triple clamp and steering head and then along the inside of the main frame of the motorcycle. In one embodiment, the mechanical KERS system is constructed along both sides of the front wheel and front forks. Alternatively, the mechanical KERS system may be constructed only on one side of the front wheel and front forks. In further embodiments, a portion of the mechanical KERS system may even be constructed and housed within one or both of the front forks. The following description provides an exemplary embodiment that includes a mechanical KERS on both sides of the front wheel and front forks. An advantage of having the mechanical KERS system constructed on both sides of the front wheel and front forks is that it can allow for balancing of the torque caused by the mechanical KERS system as it transfers power from the front wheel to the motor shaft. Another advantage is the ability to share the torque handling capacity by two sets of smaller components, e.g. two shafts and two gear sets, as opposed to using a single large gear set and one heavy shaft. The use of a balanced KERS system that captures and transmits energy on both sides of the front wheel and forks may be easier to install and operate in a safe manner with minimal impact on vehicle dynamics. Independent of whether the mechanical KERS system is along one or both sides of the front wheel, by providing the shafts and gears as described herein, it is possible to maintain the aesthetic appearance of the motorcycle.

Figure 1A:
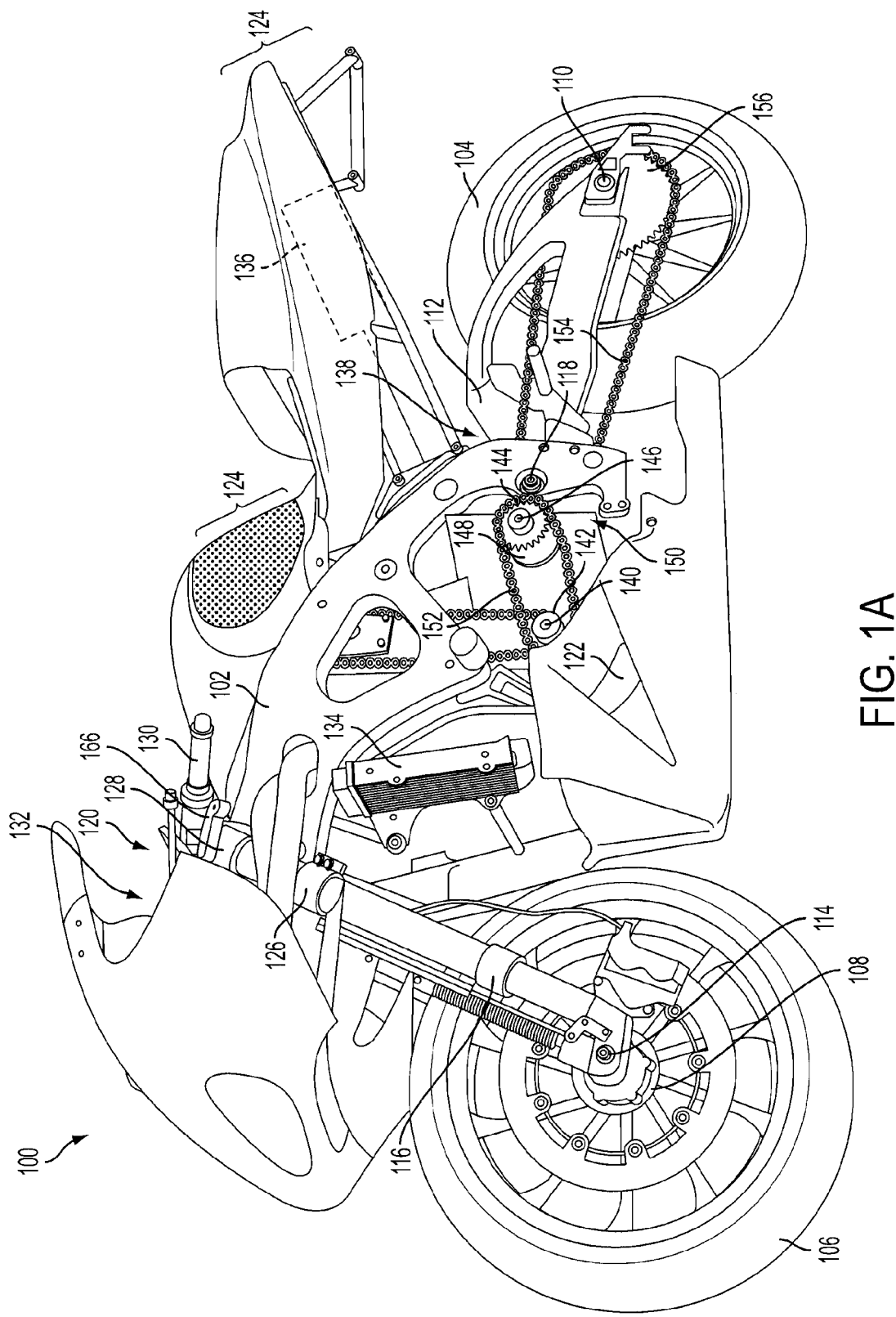
FIG. 1A is a left side view of an electric motorcycle equipped with a front wheel KERS system in accordance with one exemplary embodiment.

The basic structure of a motorcycle according to an exemplary embodiment equipped with the mechanical KERS system is shown in FIG. 1. The motorcycle includes a main frame connected to a front wheel and a rear wheel via the front and rear suspension. The main frame houses and supports the front and rear suspension, electric motor, motor controller, electronics, the electrical accumulator and all the ancillaries. At the front portion of the frame, the triple clamps attach to the steering head portion of the frame. One or more handlebars may be connected to the front fork that connects to the front wheel. Opposite the handlebars and front fork are the swing arm and rear wheel. The swing arm connects to and locates the rear wheel, which may be powered by the electric motor by way a chain or a set of chains and a one way sprag clutch, also known as a one-way freewheel, or sprag bearing, that allows the rear wheel to be driven by the electric motor in the forward direction and free wheel in the opposite direction.

In accordance with this general description, FIG. 1 shows a KERS system equipped motorcycle 100 having a mechanical KERS system. The KERS system equipped motorcycle 100 includes a frame 102, rear wheel 104 and a front wheel 106 equipped with a one-way front wheel hub 108 that includes at least one sprag clutch. The rear wheel 104 rotates about a rear wheel axle 110 that is attached to swing arm 112. Swing arm 112 is attached to frame 102 at pivot point 118. The front wheel 106 rotates about a front wheel axle 114 that is attached to front forks 116. Front forks 116 attach to a lower triple clamp 126 and an upper triple clamp 128. Lower triple clamp 126 and upper triple clamp 128 are rotatably attached to a steering head 120 located and integral to the front of frame 102. A left handlebar 130 and a right handlebar 132 are attached to front forks 116. Alternately, left handlebar 130 and right handlebar 132 may be attached to upper triple clamp 128, or a single set of handlebars may be used. Left handlebar 130, right handlebar 132, upper triple clamp 128, lower triple clamp 126, steering head 120, front forks 116, front wheel axle 114 and front wheel 106 together form the steering assembly.

Frame 102 may include various combinations of frame tubing, bars, and other supporting members. The material and design of the frame should not be viewed as limiting. Various materials may be used such as carbon fiber, titanium, steel, aluminum alloys, magnesium alloys or combinations thereof.

Frame 102 will typically support the electric motor 122, an electrical accumulator 124, a cooling system 134, and an electric motor controller 136 among other components. The combination of an electric motor and electric motor controller capable of electrical regeneration is preferably used such as the PowerPhase® 145 Traction System manufactured by UQM Technologies of Frederick, Colo. Electric motor 122 is rigidly mounted within frame 102 and electric motor controller 136 may be mounted within frame 102 or to a structural appendage mounted thereto. The frame may be designed to provide adequate strength and rigidity while minimizing the weight of the motorcycle. Importantly, the frame may be designed to properly distribute the weight of all the components and thus define the center of gravity of the motorcycle that has a marked effect on the overall handling of the motorcycle.

At the rear end of the frame is swing arm 112 with left and right arms pivotally attached at opposite sides of the pivot point 118. In another exemplary embodiment, swing arm 112 may be replaced by a single-sided swing arm (not shown).

The motorcycle may also include one or more shock absorber(s) 138 pivotally attached between swing arm 112 and frame 102. Different types of shock absorbers suitable for use with a motorcycle may be implemented. For example, the shock absorber may include a damper unit with a coil spring fitted around it such as produced by Ohlins, USA.

The rear wheel may be powered in different ways. In an exemplary embodiment, shown in FIG. 1, electric motor 122 has a splined motor shaft 140. Motor shaft 140 is fitted with a motor drive sprocket 142 that drives a jackshaft chain 152 that in turn drives a jackshaft input sprocket 144 fitted to a jackshaft 146. Jackshaft input sprocket 144 is preferably installed in conjunction with at least one sprag clutch that allows the rear wheel to freewheel during coasting while the front wheel mechanical KERS system is engaged. In this manner, the motorcycle may be designed so that the front wheel and the rear wheel are not locked together, thereby allowing the motor to harvest the kinetic energy from the front wheel without simultaneously powering the rear wheel. Jackshaft 146 rotates within jackshaft bearings 148 and is fitted with a jackshaft output sprocket 150. Jackshaft output sprocket 150 drives a rear wheel chain 154 that is connected to a rear wheel sprocket 156 attached to rear wheel 104. In alternative embodiments, a drive shaft or chain may be used to transfer power directly from the motor to the rear wheel without the use of jackshaft 146.

Using a jackshaft 146 as shown in FIG. 1, allows for better control of the gear ratio from the rear wheel to the motor shaft and can eliminate the need for oversized rear wheel sprockets that are typically found on other electric motorcycle designs. By using a jackshaft, the size of the rear sprocket may be reduced and gear ratios may be more precisely adjusted. Also, using a jackshaft provides more discretion on the positioning of the electric motor. A gear ratio may also be set between the front wheel and the motor shaft. The gear ratios are critical to the proper function of a KERS system and for safety, as the front and rear wheels must not be locked together and forced to rotate at the same speed through the selection of the incorrect gear ratios.

Front fork 116 may include two fork tubes held parallel to each other by upper and lower triple clamps 128 and 126. To provide for shock-absorbing suspension, the front fork may be a telescopic fork. A telescopic fork consists of two fork tubes clamped into an upper and a lower triple clamps 128 and 126 at their upper ends and to the front wheel axle 114 at their lower ends. The upper and lower triple clamps are part of the steering assembly. The axle of the front wheel is positioned between the fork tubes at the lower end. Each fork tube may include an upper portion clamped to the upper and lower triple clamps and a lower portion or leg that slides into the upper portion. Many different telescopic fork tube designs may be used. An exemplary fork tube design may include a coil spring that allows the lower portion of the fork tube to slide into the upper portion of the fork tube. Bushings between the lower portion of the fork tube and the upper portion of the fork tube may also be employed to minimize friction. Other known damping arrangements may also be employed.

In addition to holding the fork tubes in place, in an exemplary embodiment the upper triple clamp 128 may also support handlebars 130 and 132 and be rotatably supported by steering head 120.

The front and rear wheels may be equipped with standard friction brake systems. Different friction brake systems may be employed such as, but not limited to disc brakes, drum brakes, or hydraulic brakes. The brakes may be controlled by the rider using levers or switches mounted on the handlebar. An advantage that may result from the KERS system in accordance with exemplary embodiments is a more simplified braking system. Regeneration using a KERS system harvests the energy from the front wheel utilizing the energy that would otherwise have to be dissipated in heat by a front friction brake. In doing so, the KERS system effectively functions as a supplemental front brake while allowing for the regeneration of energy. For this reason, application of the KERS system may also be referred to as "KERS braking" or "regenerative braking event," and the torque applied to the motor during employment of a KERS system may be referred to as "regenerative braking torque." Because of the additional braking that may be supplied by a KERS system, the implementation of a KERS system may result in less friction braking power necessary for the front wheel. In an embodiment using disc brakes, for example, the vehicle may include a single disc brake as opposed to two disc brakes as the additional braking that would be provided by the second disc brake may instead be supplied by the KERS system.

In accordance with exemplary embodiments, the front wheel mechanical KERS system transfers power from the front wheel to the electrical accumulator by transferring the kinetic energy from the front wheel to the motor that can be controlled to become a generator by way of a regenerative braking torque effectuated by a motor controller. The mechanical KERS system may generally include one or two front shafts that turn when the front wheel is rotating in a forward direction. The front shafts extend vertically along the front fork and engage a main shaft through a set of gears. The main shaft then extends inside the motorcycle frame and connects to a chain through a gear box. The chain ultimately engages the motor shaft via a sprocket so that it can apply a load to the motor shaft. The load to the motor shaft is then used by the motor to generate power.

Figure 1B:
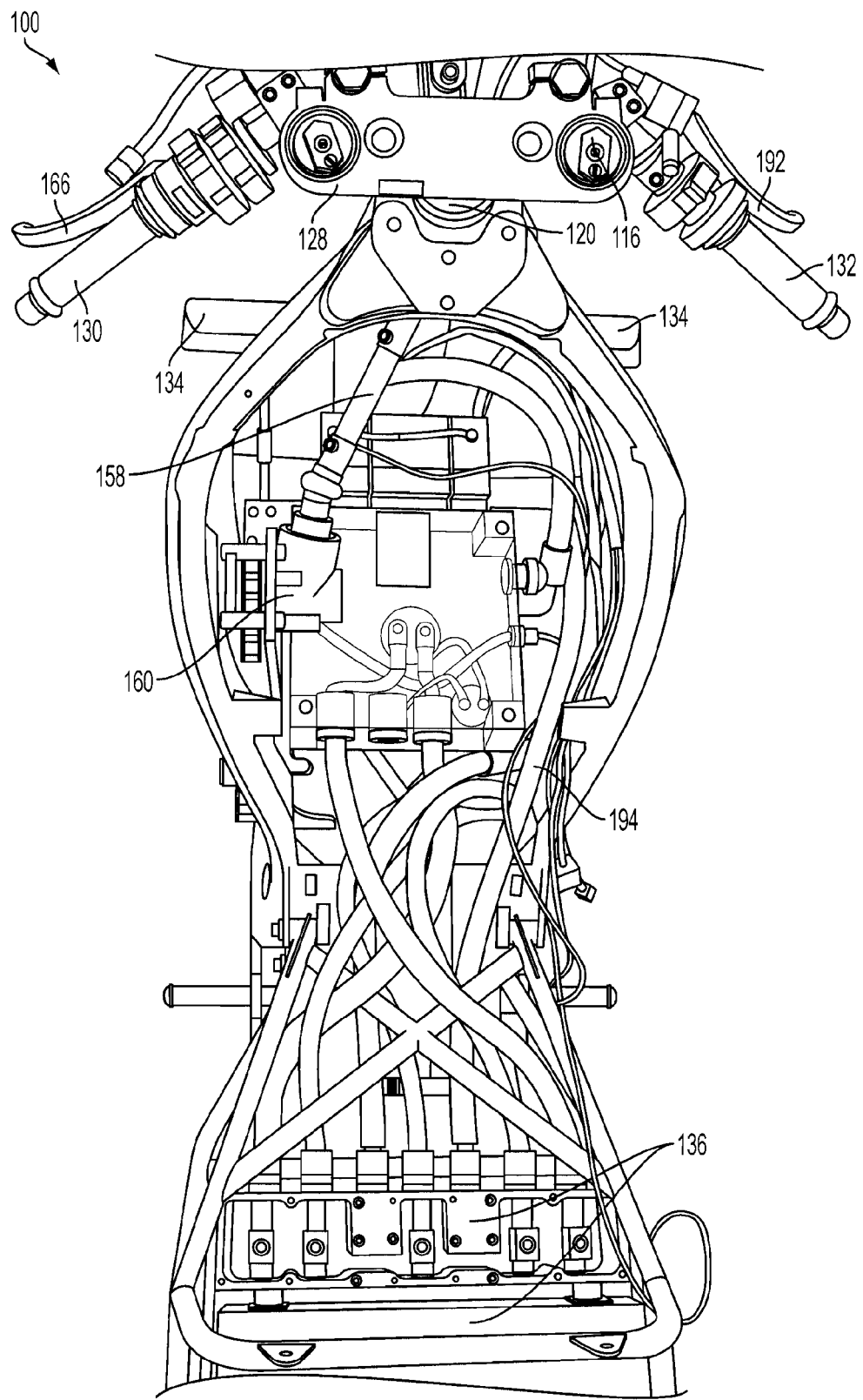
FIG. 1B is a top down view of an electric motorcycle equipped with a front wheel KERS system in accordance with one exemplary embodiment.
Figure 2:
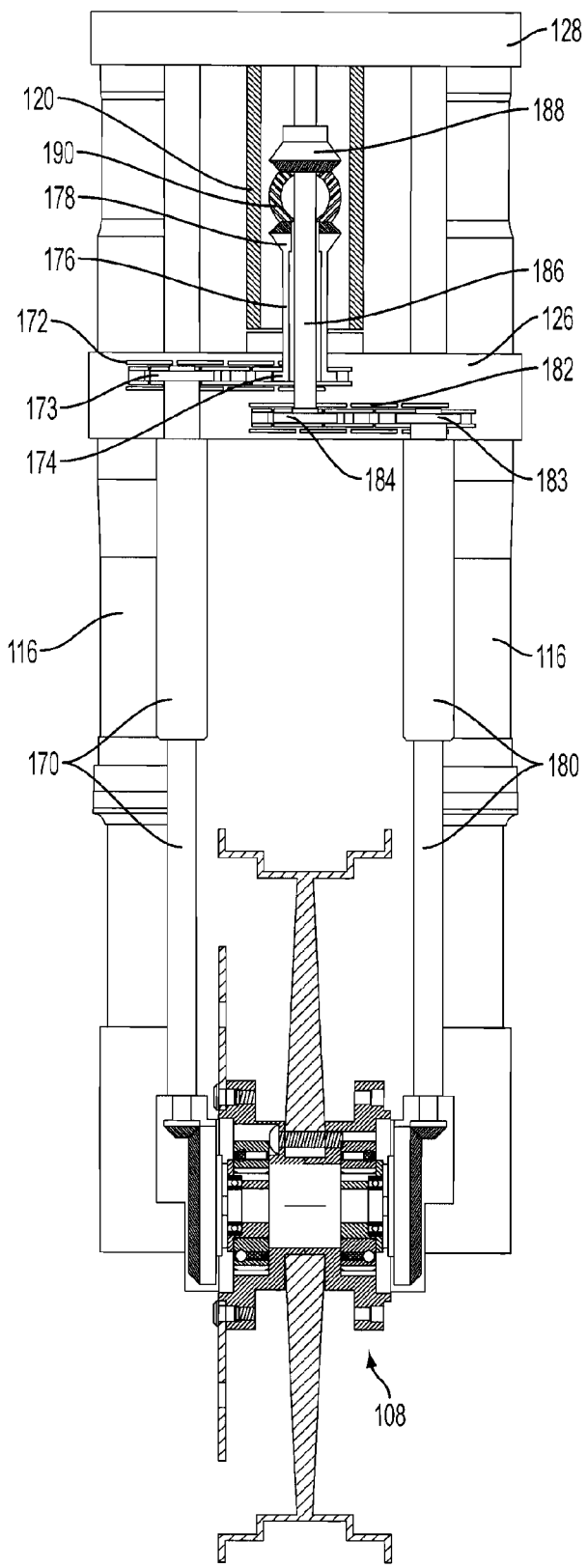
FIG. 2 is front view of a mechanical KERS system equipped motorcycle showing the steering head, triple clamps, front suspension (forks), steering apparatus and sectioned front wheel hub.

An illustration of an exemplary embodiment of the mechanical KERS system is provided in FIGS. 1-6. In one embodiment, a portion of the front wheel mechanical KERS system extends from the front wheel to the steering head. As shown in FIG. 2, this portion of the mechanical KERS system may include a set of shafts and gears that are able to transfer the kinetic energy from the front wheel to the drive shaft. The mechanical KERS system front shafts 180 and 170 engage the front wheel with a set of gears explained in further detail below. Although various types of shafts can be used to implement the mechanical KERS system, the shafts used throughout the mechanical KERS system are preferably rigid shafts made of a light weight material. Using rigid shafts enables a full range of steering and instantaneous power transfer from the front wheel to the motor with low friction. Typically, rigid shafts are very efficient in transferring power and do not exhibit a rotational displacement problem that can be present when using flexible shafts when subject to a torque.

In an illustrative embodiment, this set of shafts and gears is located along the front fork and outside the motorcycle shock-absorbing front fork 116 with a first set of chains and sprockets optionally located inside the lower triple clamp 126. Alternatively, this portion of the mechanical KERS system may instead be fully integrated within the front fork 116 and the lower triple clamp 126.

To allow the motorcycle to still benefit from the shock absorption of the front fork 116, the mechanical KERS system may be designed to include telescoping front shafts 180 and 170 that can extend and retract vertically to accommodate the extension and retraction of the front fork 116 while simultaneously transmitting full torque without binding. In an exemplary embodiment, the KERS system may include upper and lower front shafts. In such an embodiment the lower shafts are guided using one or more longitudinal races and ball bearings designed to allow the lower shafts to transfer torque to the upper shafts while at the same time being able to slide into the upper shafts when necessary to accommodate the compression of the front fork.

At the steering head 120, the kinetic energy from the front wheel is transferred to a drive shaft 158 using a steering head mesh gear 190. In an exemplary embodiment, the drive shaft 158 engages the gears in the steering head using a bevel gear set located within the steering head. The motorcycle steering head gear 190 is preferably located within the motorcycle steering head 120 at or near the centerline of the motorcycle 100 immediately behind the axis of steering of the motorcycle steering mechanism. Positioning the motorcycle steering head gear 190 and the front end of the rotating drive shaft 158 on the center line of the motorcycle 100 will result in minimal torque reactions that could otherwise affect steering and control. Similarly, the upper steering head gear 188 and lower steering head gear 178 are located within the motorcycle steering head 120 at or near the axis of steering of the motorcycle steering mechanism to minimize or eliminate torque reactions that could affect steering and control. The steering head is standard-size or, alternatively, enlarged in comparison to a standard motorcycle to allow for full steering capabilities while transferring power from the front wheel to the main shaft.

Figure 5:
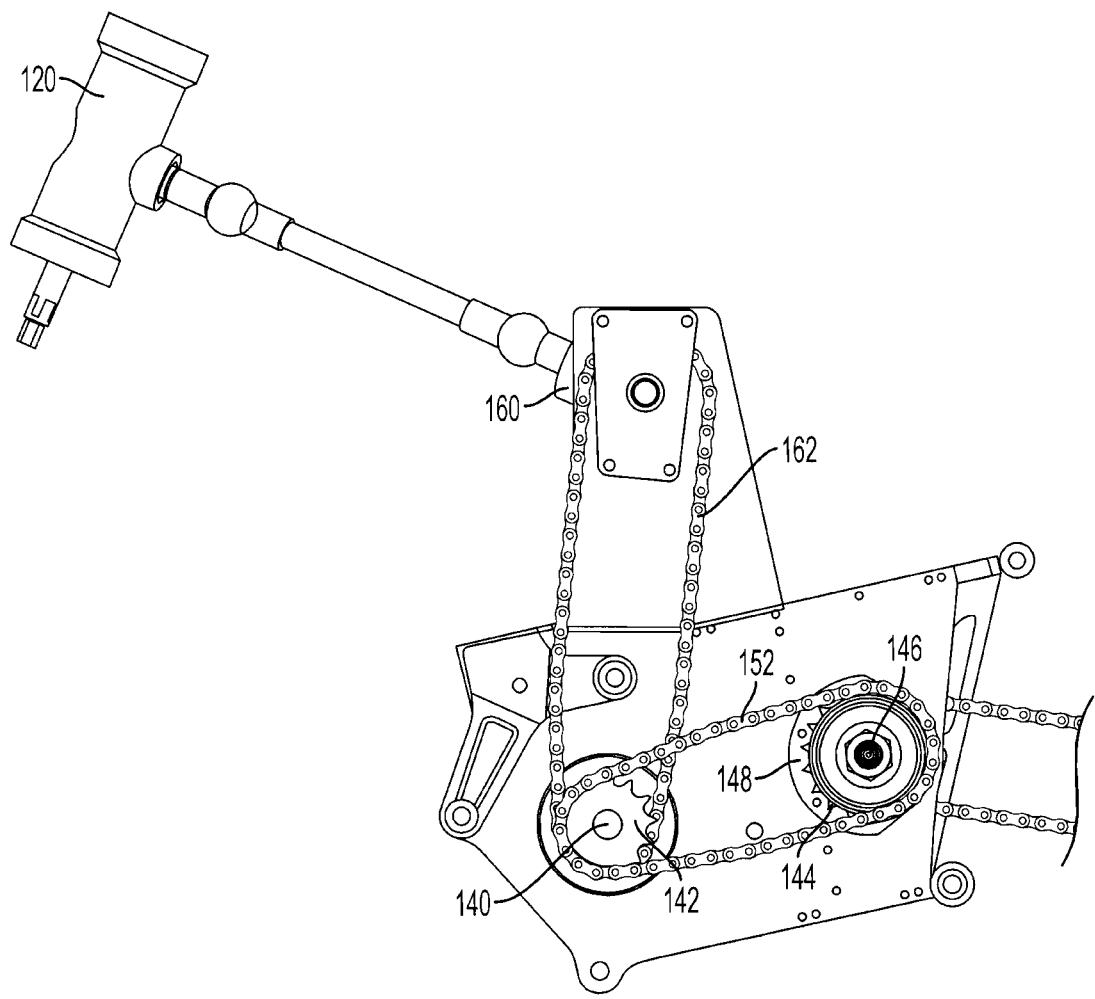
FIG. 5 is a representation of the left side view of a KERS system equipped motorcycle including the steering head portion of the motorcycle frame, shafts and universal joints, upper gearbox, chains, motor shaft, jackshaft, and electric motor mounting plates.
Figure 6A:
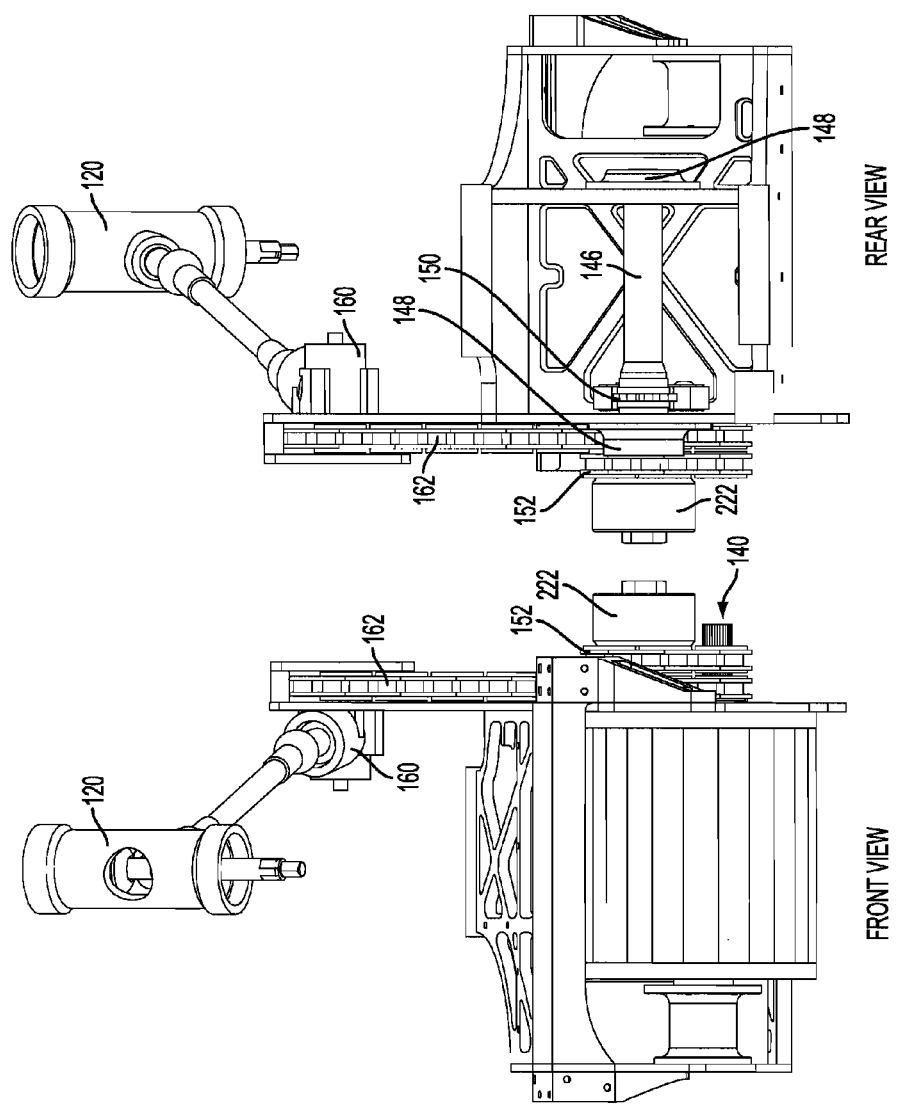
FIG. 6A illustrate front and rear views of a KERS system equipped motorcycle, including the steering head portion of the motorcycle frame, shafts and universal joints, upper gearbox, chains, motor shaft, jackshaft, and electric motor mounting plates.

As shown in FIG. 1B, the drive shaft 158 extends from the steering head to a gear box 160 inside the motorcycle frame. The drive shaft 158 should be firmly supported at both ends to enable free rotation, while still smoothly transferring of power from the motorcycle steering head mesh gear 190. In one embodiment, universal joints may be used to connect drive shaft 158 with the various components. At the end opposite from the steering head 120, the drive shaft 158 engages a gear box 160. As shown in FIGS. 5 and 6A, the gear box 160 may be used to transfer power from drive shaft 158 to a sprocket engaged with KERS drive chain 162. An advantage of using a gear box is the ability to transfer power from the drive shaft 158 to the KERS drive chain 162 at an angle. For example, the angle may be 100 degrees allowing for more flexibility in the design. The gear box 160 may then engage the KERS drive chain 162 that extends to the motor shaft 140 engaging the motor shaft using a motor KERS drive sprocket 164.

Figure 3:
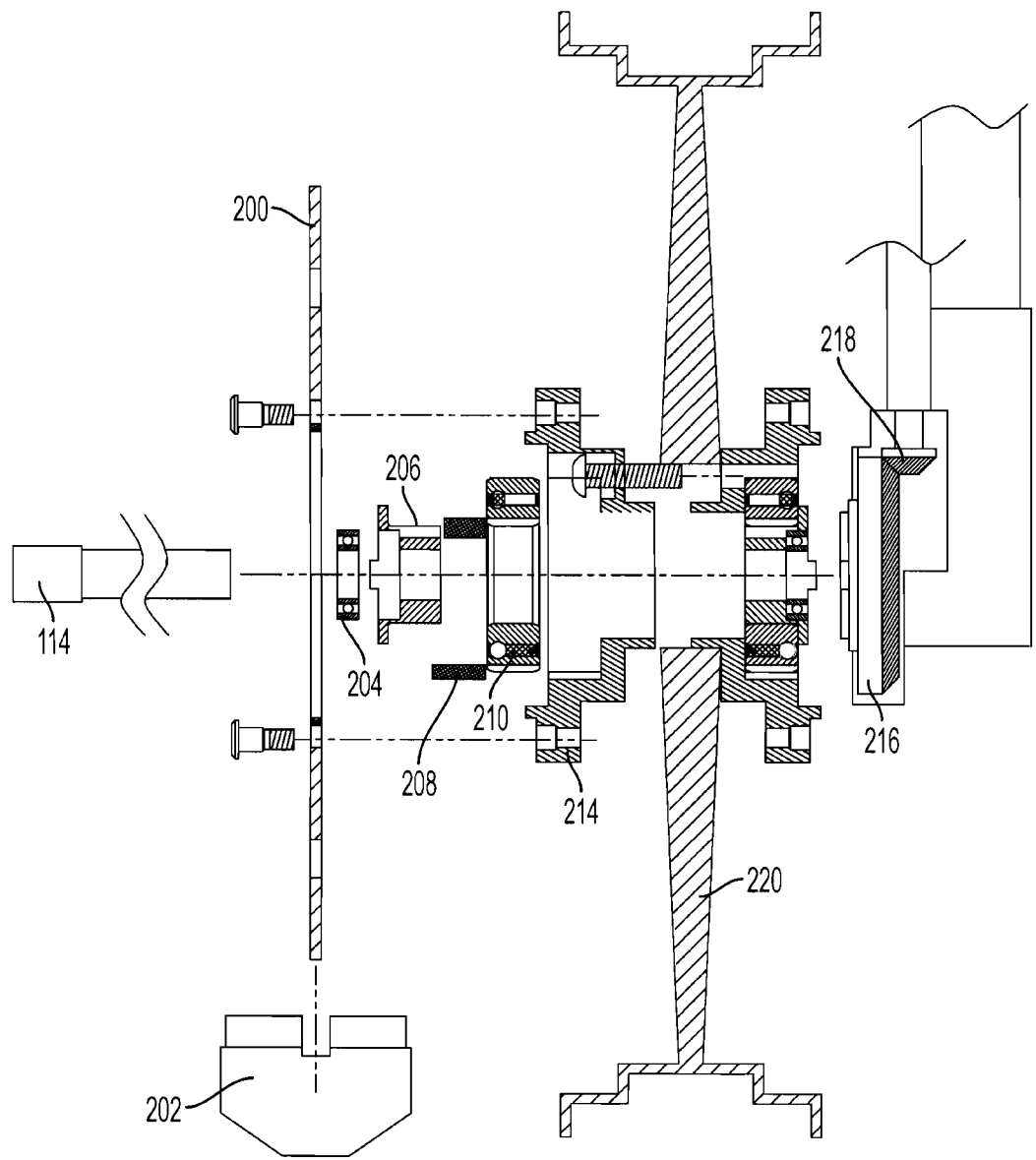
FIG. 3 is a more detailed exploded view of the front wheel hub.

FIG. 3 shows a detailed section view of the front wheel hub and its subassembly. As shown in the exploded view on the left side of FIG. 3, front wheel hub 108 includes an axle 114, disc or brake rotor 200 operatively engaged with caliper 202, axle bearing 204, drive hub 206, key(s) 208, and sprag clutch 210. Sprag clutch 210 can include one or more internal bearings. In order to assemble the front wheel hub 108, the axle bearing 204 can be inserted into the drive hub 206. Next, drive hub 206 may be inserted into sprag clutch 210. When drive hub 206 is placed inside of sprag clutch 210, one or more keys 208, such as square or rectangular metal pieces, may then be inserted into the spaces between the assembly of the drive hub 206 and sprag clutch 210 in order to lock the assembly together. The drive hub 206 and sprag clutch 210 assembly can then be placed inside of clutch housing 214 which holds the drive hub 206 and sprag clutch 210.

Clutch housing 214 may be integral to wheel 220 or fastened to wheel 220 using one or more screws, bolts, etc. Referring now to the right side of FIG. 3, the drive hub 206 may then operably engage a ring gear 216. Ring gear 216 may then operably engage pinion gear 218 which turns one of the KERS system front shafts.

To complete the front wheel hub 108, a disc or brake rotor 200 may be placed in between the front fork 116 and the assembly of drive hub 206 and sprag clutch 210 that resides in clutch housing 214. One or more screws, bolts, etc. may be used to fasten the disc or brake rotor 200 to the clutch housing 214.

Referring now to both FIGS. 2 and 3, when the front wheel 106 is assembled, power is transferred from the front wheel 106 to the electrical accumulator using a front shaft 180 and a front shaft 170 located along the front fork 116. The front wheel hub 108 may be equipped with sprag clutch 210 that allows the front wheel to free-wheel in one direction and engage the mechanical KERS system in the opposite direction. Using a sprag bearing or sprag clutch 210 at the front wheel hub 108 allows the front wheel 106 to transfer the kinetic energy when engaging the mechanical KERS system, while preventing the front wheel 106 from being driven by the motor 122. In other words, using a sprag clutch 210 prevents power transfer from the motor 122 to the front wheel 106, such that the motorcycle 100 is rear-wheel drive.

As will be described in further detail with respect to FIGS. 6A-6C, 7, and 8A-8B, by using sprag clutches that allow the front 106 and rear 104 wheels to free wheel in one direction, it is possible to operate the front wheel 106 mechanical KERS system independently and separately from the powering of the rear wheel 104. In this manner, the front wheel 106 is not powered by the motor 122 and the rear wheel 104 is not locked in with the mechanical KERS system.

To transfer the kinetic energy, the front wheel 106 engages each of front shafts 170 and 180 using a gear system such as a ring and pinion gear as described above, a hydraulic coupling, a roller clutch, a ratchet clutch, or hub clutch. Additionally, the front wheel hub 108 may optionally include a torque-limiting clutch to enable release of extreme torque loads. For illustrative purposes only, the present application describes an exemplary embodiment in which the mechanical KERS system includes ring 216 gear and pinion gear 218 on each side of the front wheel to connect the front wheel 106 to front shaft 180 and front shaft 170 of the mechanical KERS system.

Once front shafts 180 and 170 are engaged with the front wheel, they transfer power through a set of shafts generally located along or optionally within the front fork 116, and within the steering head 120 and motorcycle frame 102. The shafts 180 and 170 may be held in place using bearings or bushings at either or both ends. Different bearings or bushings keep the shafts 180 and 170 in place while allowing for free rotation and for vertical movement of the front shafts 180 and 170 so that the mechanical KERS system is able to adjust for the movement of the shock-absorbing system of the front fork 116 while transferring the kinetic energy from the front wheel 106 to the steering head 120.

When engaged, the front shafts 180 and 170 may be designed to rotate in opposite directions. This may lead to a better counter balance of the torque created by their motion. At their upper ends, the front shafts 180 and 170 engage gears or chains and sprockets located in the lower triple clamp 126. These gears or chains and sprockets then transmit power upward through the steering head 120 as explained in more detail below.

In an exemplary embodiment, the KERS front shafts 170, 180 operatively engage the sprockets 173 and 183 respectively within the lower triple clamp 126. Different methods may be used to operatively engage front shafts 170 and 180 with sprockets 173 and 183, for example the shafts may include a splined surface at least on an upper end thereof; alternatively, they may have a square or other design that fits inside the sprockets. The upper end of the front shaft 170 slides into and powers lower triple clamp sprocket 173, and the upper end of front shaft 180 slides into and powers lower triple clamp sprocket 183.

Figure 4:
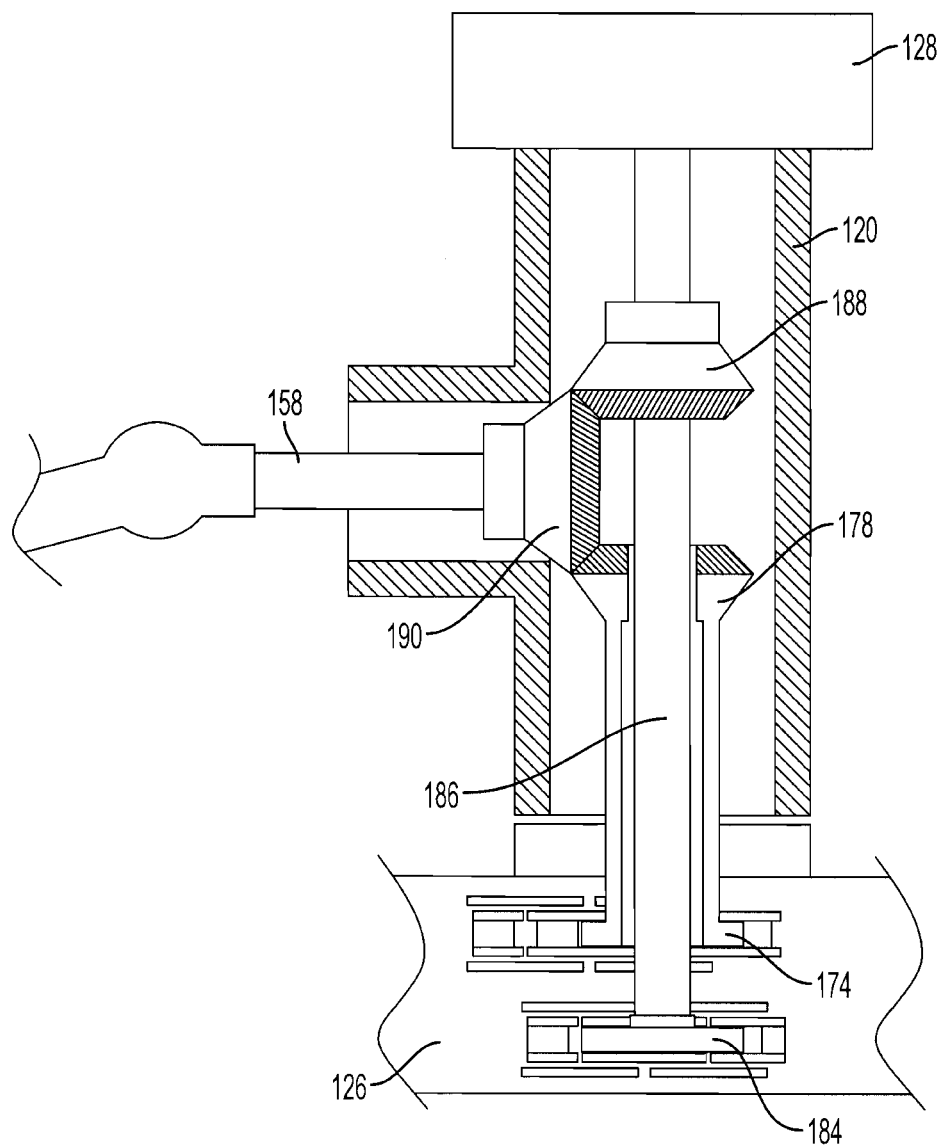
FIG. 4 is a representation of a series of bevel gears and shafts located in the steering head portion of the motorcycle frame.

As shown in FIGS. 2 and 4, the lower triple claim 126 may be equipped with a first series of triple clamp sprockets 184, 183 that drive an inner tube 186 via chain 182 and a second series of meshing triple clamp sprockets 174, 173 drive an outer tube 176 via chain 172. Although in the illustrated exemplary embodiment the lower triple clamp 126 is equipped with four sprockets and two chains, the number of sprockets and chains employed should not be viewed as limiting. Sprockets 183 and 173 are engaged by the upper portions of front shafts 180 and 170 respectively. Chain 182 operatively engages sprocket 184 and sprocket 183, while chain 172 operatively engages sprocket 174 and sprocket 173. Sprockets 183, 184, 173, and 174 may be sprockets or any other type of gear that may be engaged with chains. In this manner, as the front shaft 180 turns sprocket 183 it turns chain 182 that turns sprocket 184. Similarly, as the front shaft 170 turns sprocket 173 it turns chain 172 that turns sprocket 174. The gears powered by the shaft 180 may rotate independently from those engaged by the shaft 170. This may be achieved by aligning the gears and chains on different planes as shown in FIG. 2. Specifically, in an exemplary embodiment, sprockets 183, 184, and chain 182 are located on one plane while sprockets 173, 174 and chain 172 are located on a different plane either above or below the plane on which sprockets 183, 184, and chain 182 are located. This may also prevent interference between the operation of the two sets of sprockets and chains. Like the front shafts 170 and 180 described above, sprockets 184, 183 and chain 182 may rotate in the opposite direction than sprockets 174, 173 and chain 172. This counterbalances the torque within lower triple claim 126.

Lower triple clamp 126 holds lower triple clamp sprockets 184, 183, 174, and 173 and chains 172, 182 in a fixed position with support bearings protecting the rider and allowing free rotation. The arrangement and number of these gears is not limited to a specific set. Numerous alternate gear combinations may be used for transmitting power from the front portion of the mechanical KERS system to the drive shaft 158. For example, the front fork designs may employ the use of expanding ball spline universal joints in the place of the sprockets and chains 172-174 and 182-184. Also, lower triple clamp sprockets 184, 183, 174, and 173 may include different types of gears with different designs such as spiral design, straight teeth, or any other suitable gear design known to one of ordinary skill in the art. For example, helical gears may be used for their strength, smoothness and quieter power transfer.

In an exemplary alternative embodiment, instead of using a chain and gear combination, the power from the front shafts 170 and 180 may be transferred to inner and outer front tubes 186 and 176 by a set of meshed gears. In this manner, as the front shafts 180 and 170 rotate, they rotate the first gear they each engage in the lower triple clamp 126. Those gears will in turn transfer power to other gears meshed thereto that can in turn transfer power to other gears meshed thereto until the gears connected to inner and outer tubes 186 and 176 are reached. Like the gear and chain arrangement discussed above, a meshed gear arrangement may also be designed to work on two planes so that the gears powered by front shaft 170 do not impede movement of the gears powered by front shaft 180.

As shown in FIGS. 2 and 4, inner sprockets 184 and 174 are engaged to an inner front tube 186 and an outer front tube 176 respectively. The inner and outer front tubes 186 and 176 are used to transfer the power from the lower triple clamp gears to the drive shaft 158. The gears or sprockets can be made to engage the inner and outer tubes 186 and 176 using different designs. In one exemplary embodiment the invention uses support bearings that allow the inner and outer tubes 186 and 176 to be rotated by the inner gears or sprockets located in the lower triple clamp 126. The inner and outer front tubes 186 and 176 may be aligned along the steering axis and may be supported on bearings located in the steering head 120 and the upper triple clamp 128. In this manner they do not restrict or hinder steering of the motorcycle 100.

With continued reference to FIGS. 2 and 4, inner and outer front tubes 186 and 176 may extend into the steering head that may include mesh gear 178 attached to and powered by the outer tube 176, mesh gear 188 attached to and powered by inner tube 186, and mesh gear 190 engaged and powered by mesh gears 178 and 188. Mesh gear 190 may also be connected to drive shaft 158 to transfer the power from inner and outer front tubes 186 and 176 to drive shaft 158. In this manner, the combined rotational power of inner and outer tubes 186 and 176 may be transferred to drive shaft 158 by way of mesh gear 190. Mesh gears 178, 188, and 190 are not limited to a particular design. In an exemplary embodiment, these gears are bevel edge gears. To accommodate these gears, the steering head 120 preferably has a cut away section in the center. Also, the steering head 120 is designed to act as a gear casing located between the upper ends of the fork members and below the handlebars 130 and 132. This is done by designing the cut away to create two sections supported by needle bearings within the steering head 120 and by clamping power of the upper and lower triple clamps 128 and 126 above and below the steering head 120 so as not to interfere with rotation of the handlebars 130, 132 and fork members.

As with the gears in the lower triple clamp 126, gears 178 and 188 may be designed to rotate in opposite directions to help counterbalance the rotational torque inside the steering head 120. Drive shaft 158 is thereby rotated using gear 190 located at its front end and engaged with mesh gears 178 and 188.

At the opposite end from the steering head 120, drive shaft 158 engages a gear box 160 that engages a KERS drive chain 162. The KERS drive chain 162 runs from the gear box 160 to the motor shaft 140. Accordingly, as the drive shaft 158 transfers the rotational power from inner and outer tubes 186 and 176, it engages gear box 160 and causes KERS drive chain 162 to rotate. As the KERS drive chain 162 rotates it turns a sprocket located on the motor shaft 140. In engaging the sprocket, KERS drive chain 162 induces a load to the motor shaft 140 that is then used by the electric motor to generate electrical energy that may be transferred to the electrical accumulator.

The motor is not limited to a specific design. In an exemplary embodiment, the motor is a liquid-cooled electric motor with instant torque response that is able to provide 194 horsepower. However, even more or less powerful motors may be employed.

As discussed previously in conjunction with exemplary embodiments, the front wheel of the vehicle may be operatively engaged to the motor shaft using a series of gears and/or sprockets. Similarly, the rear wheel may be operatively engaged to the motor shaft using a series of sprockets and/or gears. As explained in more detail in the following paragraphs, these gearing systems between the motor shaft that the front and rear wheels may be designed to obtain desired gear ratios and to obtain a differential system that allows the front and rear wheels to rotate at varying relative speeds.

Figure 6B:
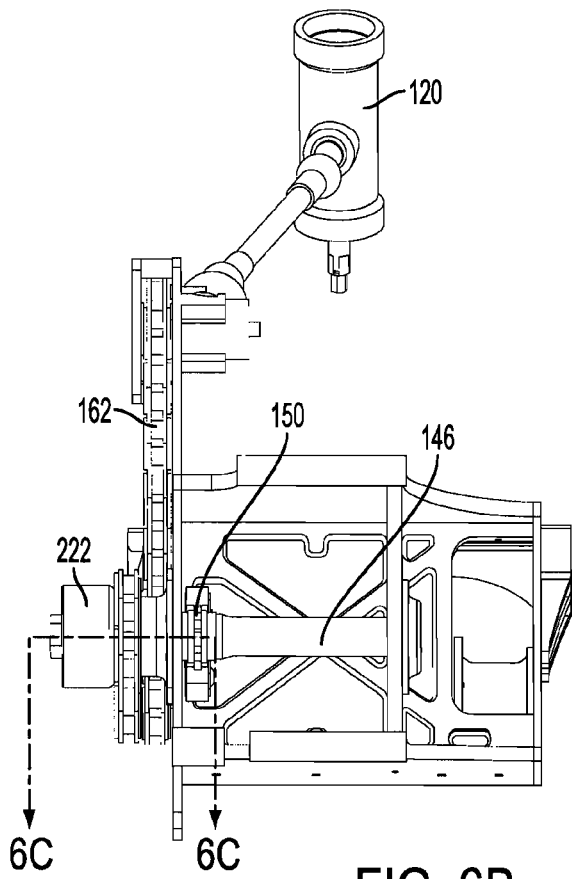
FIG. 6B is an elevated view of a KERS system equipped motorcycle, including the steering head portion of the motorcycle frame, shafts and universal joints, upper gearbox, chains, motor shaft, jackshaft, and electric motor mounting plates.

FIGS. 6A-6B illustrate partial front and rear views of a KERS system in a motorcycle. In an embodiment, motorcycle 100 includes a sprag clutch housing 222, a portion of a steering head 120 of the motorcycle frame, shafts and universal joints, such as jackshaft 146, jackshaft output sprocket 150, an upper gearbox 160, chains, motor shaft, and electric motor mounting plates.

Figure 6C:
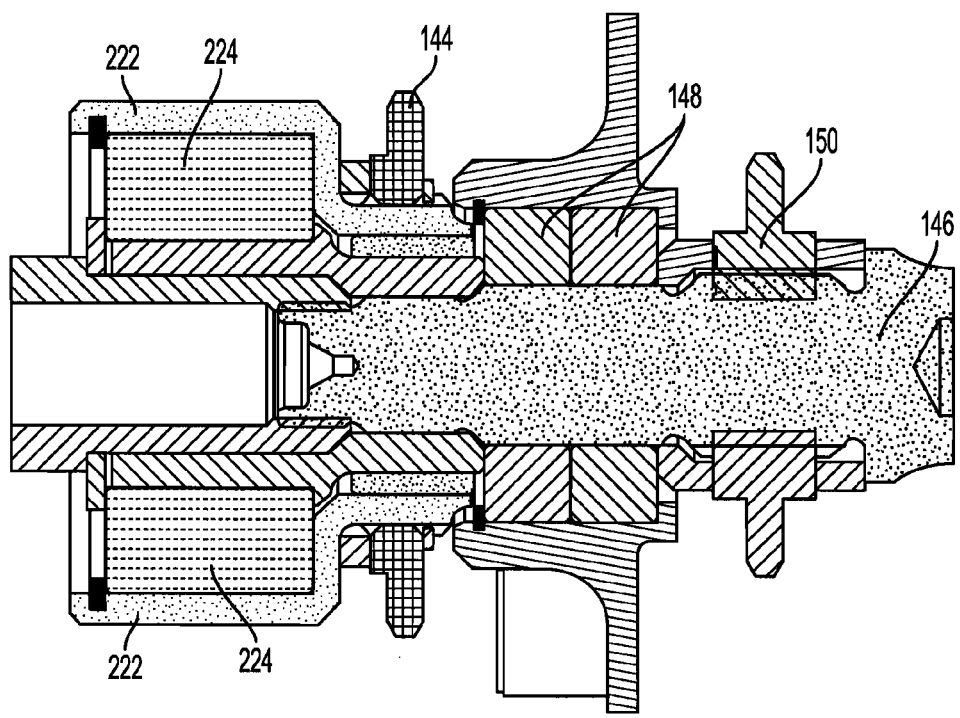
FIG. 6C is a cross-sectional view of the jackshaft where the rear wheel sprag clutch is located.

Moving now to FIG. 6C, a cross-sectional view of the jackshaft of FIG. 6B where the rear wheel sprag clutch housing 222 may be located is illustrated. As shown, sprag clutch housing 222 includes a sprag clutch 224. Although sprag clutch housing 222 as illustrated includes one sprag clutch 224, multiple sprag clutches may be used depending on the amount of torque applied and torque capacity of the sprag clutches used. As further depicted, jackshaft 146 includes a jackshaft input sprocket 144, jackshaft bearings 148, and jackshaft output sprocket 150. In the illustrated embodiment, as jackshaft 146 rotates within jackshaft bearings 148, it turns jackshaft output sprocket 150. When jackshaft output sprocket 150 is turned, the rear wheel chain (not shown) transfers power to the rear wheel 104. Although a specific number of sprockets and gears are depicted, a person of skill in the art will appreciate that any number of sprockets and/or gears may be used.

Figure 7:
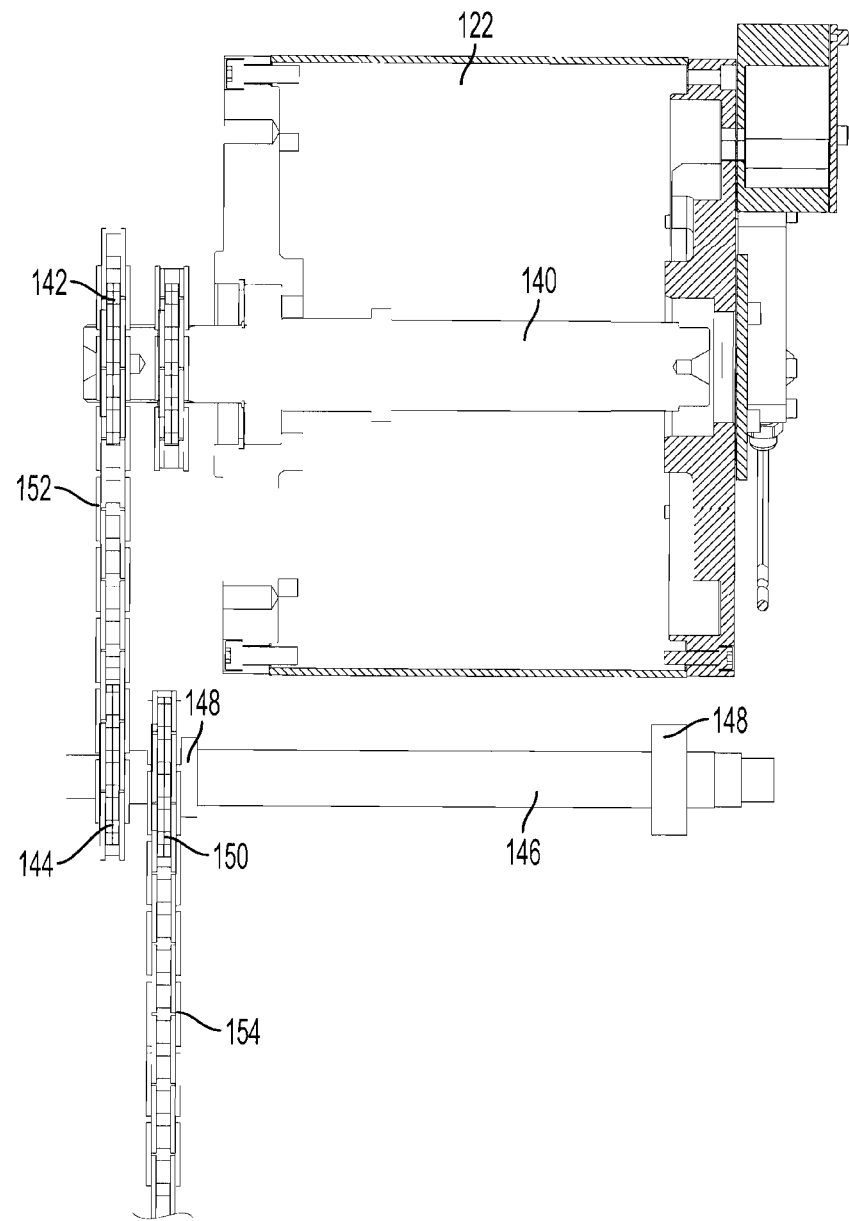
FIG. 7 is a top down view of the layout of a KERS system equipped electric motorcycle including the electric motor, motor shaft, jackshaft, chains, and drive sprockets.

FIG. 7 is an additional top down view of the layout of a portion of a KERS system in an electric motorcycle including the electric motor, motor shaft, jackshaft, chains, and drive sprockets. In the illustrated embodiment, motorcycle 100 includes electric motor 122, motor shaft 140, motor drive sprocket 142, jackshaft input sprocket 144, jackshaft 146, jackshaft bearings 148, jackshaft output sprocket 150, jackshaft chain 152, rear wheel chain 154, KERS drive chain 162, and KERS drive sprocket 164.

As described above, if the drive and regenerative braking torques are to be provided by the same device (e.g., electric motor 122) in a KERS system equipped motorcycle 100, then a system and method for transferring torque between the device and both wheels is needed. As discussed, the front wheel 106 and rear wheel 104 of motorcycle 100 may be connected to the motor 122 directly through the drive trains of gears and chains. Unfortunately, connecting both front and rear wheels 106 and 104 to a single device (e.g., electric motor 122) may result in effectively connecting both front and rear wheels 106, 104 together and result in the front and rear wheels 106 and 104 being forced to always spin at the same rate.

The wheels of motorcycles, however, often rotate at slightly different speeds under varying conditions, e.g., acceleration vs. deceleration, front tire wear vs. rear tire wear, different tire radii due to lean angles during turns, etc. Forcing the wheels of a motorcycle to spin at the same speed can cause at least one tire to slip, resulting in rapid wear and potentially dangerous loss of traction.

For example, when a rider of motorcycle 100 leans during cornering, the radii of the front and rear wheels 106 and 104 may be reduced due to the profile of rear tires commonly made today. However, because of their design the front wheel radius may change less than the rear wheel radius. If the radius of the front wheel 106 changes more quickly than the radius of the rear wheel 104 a rider may lose control when motorcycle 100 is leaning if the wrong gear ratios are used between the motor 122 and front wheel 106, relative to the gear ratios between the motor 122 and the rear wheel 104.

As previously discussed, the disparity between front and rear tire wear can also be attributed to the large accelerations and decelerations that are associated with motorcycle racing. For example, when a motorcycle lifts up during a state of acceleration (e.g., wheelies) or the rear wheel of the motorcycle lifts up during a state of braking, rapid changes of the radii of the front and rear wheels 106 and 104 occurs.

Although traditional passive differentials that are employed in automotive technology, such as 4 wheel-drive (4WD) cars, can be used to overcome the foregoing problems, they may not be suitable for motorcycles. In particular, such passive differentials are not suitable for environments where there is torque split between the wheels that is not constant. Because motorcycle applications require the majority of the torque to be sent to the rear wheel during acceleration and the majority of the torque to be absorbed from the front wheel during braking (i.e., a non-constant torque split), conventional automotive differential systems may not be appropriate.

To overcome these and other problems described herein, a dead zone may be created that allows the front 106 and rear 104 wheels to spin at different speeds. A dead zone may be created by using sprag clutches 224 and 210 and selecting appropriate gear ratios for the front and rear wheels 106 and 104. Sprag clutches enable front 106 and rear 104 wheels to free wheel in one direction and operate independently of the motor 122 and/or mechanical KERS system. The use of sprag clutches and selection of appropriate gear ratios allow motorcycle 100 to be ridden safely.

Applicants have also discovered a method to determine the appropriate front and rear wheel gearing to create the desired dead zone. In particular, when sprag clutches such as rear sprag clutch 224 and front sprag clutch 210 are employed in motorcycle 100, the method may be used to select the number of teeth to utilize on the various sprockets and gears of motorcycle 100 to achieve the appropriate gear ratios between the electric motor and the front and rear wheels 106 and 104 as shown in the derivation below.

This method is derived below as a rule for the minimum gear ratio between the rear wheel 104 of motorcycle 100 and the motor 122 in order to prevent the front and rear wheels 104, 106 from locking up. As used in the derivation below, "v" represents the vehicle speed (in/s), "R" represents wheel radius (in), "r" represents effective gear pitch radius (in), "w" represents angular velocity (rad/s), and "s" represents slip ratio (non-dimensional). Slip ratio is defined in Equation (1).

$$s = ((w \times R)/v) - 1 \qquad \text{Equation 1:}$$

Typical values for "s" during maximal acceleration range from +0.10 to +0.20. Typical values during maximal deceleration range from −0.10 to −0.20.

In the following derivation, the subscript "r" represents rear, "f" represents front, and "m" represents motor. Applying Equation 1 to the front and rear wheels and solving for vehicle speed so it can later be eliminated yields Equations (2) and (3).

$$v = w_r \times R_r/(1+s_r) \qquad \text{Equation 2:}$$

$$v = w_f \times R_f/(1+s_f) \qquad \text{Equation 3:}$$

Combining Equation (2) and Equation (3) to eliminate vehicle speed and solve for front wheel speed in terms of rear wheel speed yields Equation (4).

$$w_f = (R_r/R_f) \times ((1+s_f)/(1+s_r)) \times w_r \qquad \text{Equation 4:}$$

The sprag clutch on the rear wheel enforces Equation (5), and the sprag clutch on the front wheel enforces Equation (6).

$$w_m \times r_m \leq w_r \times r_r \qquad \text{Equation 5:}$$

$$w_m \times r_m \geq w_f \times r_f \qquad \text{Equation 6:}$$

Substituting Equation (4) into Equation (6) to express it in terms of rear wheel speed instead of front wheel speed, then rearranging Equation (5) and (6) to show the limitations on the desired gear ratio, $w_m/w_r$, yields Equation (7).

$$(r_f/r_m) \times (R_r/R_f) \times (1+s_f)/(1+s_r) \leq w_m/w_r \leq r_r/r_m \qquad \text{Equation 7:}$$

Equation (7) can only hold if Equation (8) is true in all circumstances $$(r_r/r_m) \geq (r_f/r_m) \times (R_r/R_f) \times (1+s_f)/(1+s_r) \qquad \text{Equation 8:}$$

This worst-case condition is expressed in Equation (9)

$$(r_r/r_m) \geq (r_f/r_m) \times (R_r/R_f)_{max} \times ((1+s_f)/(1+s_r))_{max} \qquad \text{Equation 9:}$$

Equation (9) is the minimum gear ratio rule the applicants have derived to ensure the front and rear wheels do not lock up, that some dead zone is present. Alternately, the rule can be expressed in terms of the front gear ratio, as shown in Equation (10)

$$(r_f/r_m) \leq (r_r/r_m) * (R_f/R_r)_{min} * ((1+s_r)/(1+s_f))_{min} \qquad \text{Equation 10:}$$

Using equation (10) above, a default of rear gear ratio, $r_r/r_m$, of 4.68639, and a worst-case wheel radius ratio, $R_f/R_r$, of 11.91/12.78, the required front wheel gear ratio, $r_f/r_m$, can be derived. For simplicity in the example, we will assume that braking is only done with the front wheel, so $s_f \leq 0$ and $s_r \geq 0$, and thus the worst-case slip term in Equation (10) is 1. The above parameters would result in the following:

$$(r_f/r_m) \leq (4.68639) \times (11.91/12.78) \times 1$$

$$(r_f/r_m) \leq 4.3674$$

In practice, some rear wheel braking should be accounted for with a slightly negative rear slip ratio $s_r$. A person of skill in the art will appreciate that the slip term in equation (10) $((1+s_r)/(1+s_f))_{min}$ may be less than 1. Thus, an even smaller gear ratio would be required.

Accordingly, for gear ratio $(r_f/r_m)$ to equal 4.3674, motor drive sprocket 142 would need to have 13.05 teeth. However, an integer number of gear teeth are needed. Because a gear ratio $(r_f/r_m)$ of less than 4.3674 is desirable, it would be preferred to have 14 teeth (e.g., a 7.27% dead zone) on motor drive sprocket 142. A person of skill in the art will appreciate that any number of teeth greater than 14 (e.g., 15 teeth—a 14.94% dead zone) may be used as long as minimum gear ratio used in rear wheel 104 is satisfied. Additionally, depending on the gear ratio and wheel radii utilized, varying numbers of teeth may be used on motor drive sprocket 142 using the method described herein. Of note, the combination of all the sprockets yields the gear ratio. Thus, depending on the gear ratio and wheel radii utilized, varying numbers of teeth may be used on motor drive sprocket 142 and/or other sprockets using the method described herein. Of note, in some embodiments, an electronically controlled (e.g., active) differential may be used in place of or in combination with one or more sprag clutches.

Furthermore, as previously described the jackshaft can be used to reduce the gear ratio between motor drive sprocket 142 and rear wheel sprocket 156 attached to the rear wheel. For example, the total gear ratio between the electric motor and the rear wheel may be 4.68 to 1, achieved with the following sprockets: 13-tooth motor drive sprocket, 18-tooth jackshaft input sprocket, 13-tooth jackshaft output sprocket, and 44-tooth rear wheel sprocket. The gear ratio is not limited to 4.68 and may be modified to obtain the desired performance.

Figure 8A:
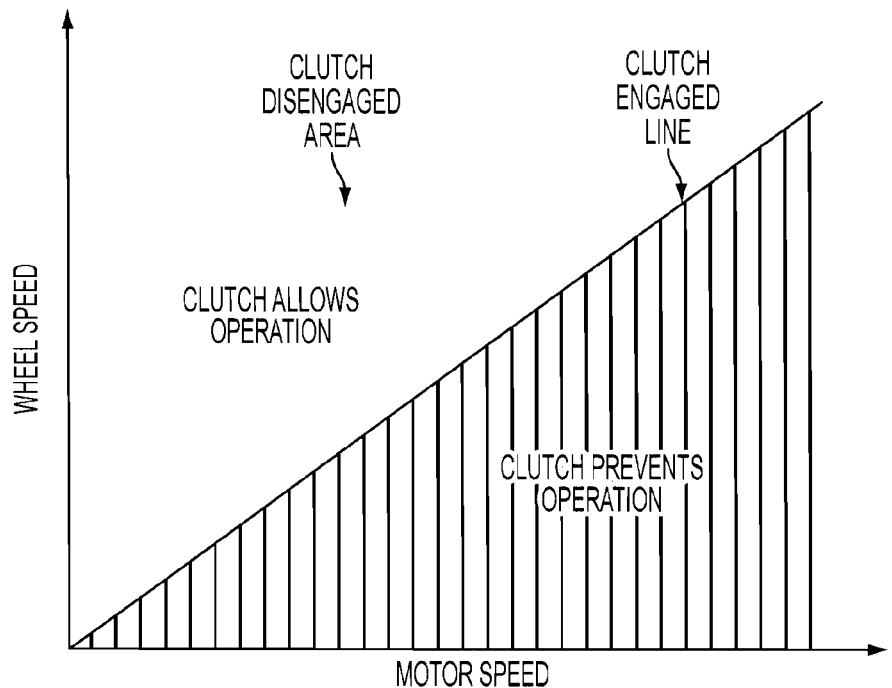
FIGS. 8A-8B are graphical representations of the "dead zone" created by the use of front and rear wheel one-way sprag clutches combined with the careful gearing of the front and rear wheels in accordance with exemplary embodiments.
Figure 8B:
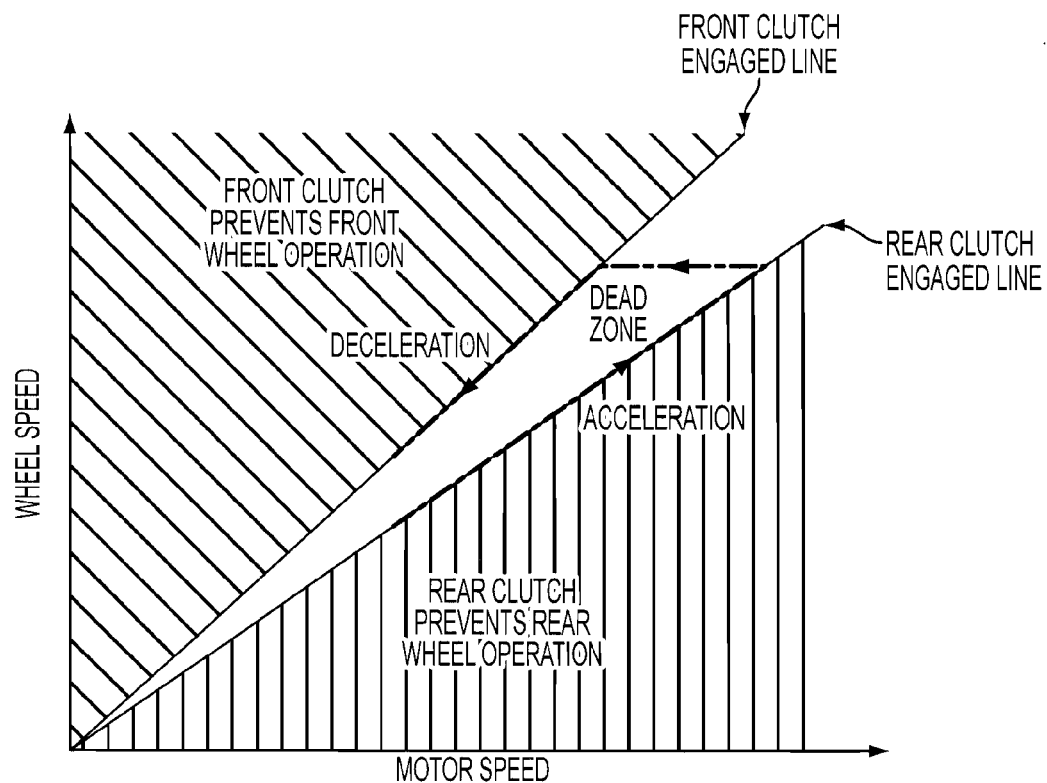

FIGS. 8A-8B illustrate graphical representations of a "dead zone" created by the use of front and rear wheel one-way sprag clutches in combination with appropriate gearing between the front and rear wheels and the motor shaft. By allowing a slight dead zone it is possible to prevent the torque from the mechanical KERS system from being applied to the rear wheel 104 and to prevent the acceleration torque from the rear wheel 104 being applied to the front wheel 106. This can advantageously prevent locking of the front and rear wheels 106, 104 and loss of control of motorcycle 100.

Although one-way sprag clutches, such as front sprag clutch 210 and rear sprag clutch 224, may be used, a person of skill in the art will appreciate that other clutch types and gearing may be used. In some embodiments, the one-way sprag clutches may be combined with other gearing of the front and rear wheels 106, 104. For example, sprockets and teeth numbers, clutches, sprag bearings, associated gearing, clutches, etc. can be arranged to allow for the dead zone.

FIG. 8A illustrates operation of a one-way sprag clutch, such as rear sprag clutch 224 that may be utilized to selectively apply torque to the rear wheel 104 of motorcycle 100. Applicants have discovered that an improved way to transfer acceleration torque to the rear wheel 104, but not braking torque, is to use a one-way clutch, e.g., an over-running clutch, free-wheel clutch, sprag clutch, etc. A one-way clutch can advantageously allow the rear wheel 104 to spin more quickly than the motor 122, but not more slowly. Thus, when the motor 122 tries to spin faster than the rear wheel 104, it engages the clutch, and transfers torque to the rear wheel 104 that accelerates the motorcycle 100. Likewise, another one-way clutch can be used in the other direction in order to transfer only braking torque from the front wheel 106.

With continued reference to FIG. 8B, a differential system that includes the combined operation of two one-way sprag clutches, such as front sprag clutch 210 and rear sprag clutch 224, on front wheel 106 and rear wheel 104 is shown. As can be seen, a slight dead zone allows the front and rear wheels to spin at slightly different speeds. Advantageously, the gearing such as the number of teeth can be selected so that there is a slight dead zone, allowing the front and rear tires to spin at variable speeds. This allows the front and rear wheels 106, 104 to free wheel in one direction and/or operate the front wheel 106 mechanical KERS system independently and separately from the powering of the rear wheel 104. In this manner, the front wheel 106 is not powered by the motor 122 and the rear wheel 104 is not locked in with the mechanical KERS system. During acceleration, the motor 122 spins faster than the wheels, and thus the rear wheel sprag bearing may be engaged while the front wheel sprag bearing is disengaged and overrunning. When the rider decelerates, the motor 122 slows down, disengaging the rear wheel sprag bearing and engaging the front wheel sprag bearing. Notably, such a dead zone feature can also be used in an opposite transition to acceleration.

In an embodiment, during acceleration the motor 122 may be trying to spin faster than the wheels, and thus the rear clutch may be engaged and the front clutch is disengaged. This acceleration process is shown as the dark solid line in the FIG. 8B. Thus, when the rider begins braking the motor slows down, the rear clutch is disengaged, and the front clutch is engaged. This process is depicted by the dark shaded line. As braking continues, the motor 122 continues to try to spin slower than the front and rear wheels 106, 104, keeping the front clutch engaged and the rear clutch disengaged. This process is shown as the dark dash-dotted line. Due to constant leaning by motorcycle riders, the threat of a loss of control that would occur without such a dead zone is quite high in road environments, thus having a dead zone can greatly improve motorcycle safety. And although dirt environments may not pose quite as large a risk because of reduced leaning and because dirt is more forgiving to locked wheels than pavement, a dead zone may still be employed to improve safety in such environments as well.

In addition to having an appropriate gearing system, exemplary embodiments may also include a control system for the KERS system and the other components of the vehicles. As discussed previously, during regenerative braking events, the KERS system may cause front wheel braking that slows the vehicle while charging the electrical accumulator. This feels like front wheel friction braking to the rider, however, in some situations such as when the electrical accumulator is in a state of high charge, full braking by the KERS system may not be achieved and thus a conventional friction braking system on the front wheel is desirable. With respect to the front wheel, the front friction brake system can work together with or independently of the KERS system. When operated at the same time, the KERS system may be engaged before, after, or simultaneously with the front friction brake. In one embodiment, the KERS system and the friction brakes are independently controlled by the rider. In this manner, the rider has full control of the application of both the friction brake and KERS system that also provides for braking. This allows experienced riders to apply the right balance of braking depending on the situation. For example, going around a turn at a high speed the rider may desire to have full control as to the application of the friction brake and/or KERS system to achieve best performance. In an exemplary embodiment, the handlebar may include a first lever to engage the front friction brake and a second lever to engage the KERS system that applies additional braking.

Alternatively, the KERS system may be made to engage automatically, i.e. the KERS system control may be integrated into the friction baking system. In such a system, an engine control unit (ECU) may be programmed to determine the appropriate application of the KERS system based on the amount of braking pressure applied by the rider such as via brake fluid pressure sensor as well as other information it receives as discussed above. The system may also be designed to include a combination of manually operated and automatic engagement of the KERS system. In this latter embodiment, the rider would have the option to choose whether to engage the automatic system or manual system, or use a proportion of both, via a switch that may be located on the handlebar. Alternatively, the switch could adjust the ratio of friction braking to the braking provided by the KERS system.

The rider can choose when to engage the KERS system using a control. The control may be a switch, a potentiometer, a push button, a lever, a cable or any similar engagement device. In the exemplary embodiment shown in FIG. 9, the control is shown as a rotary position potentiometer actuated by a KERS brake lever 166. In alternative embodiments, the rider can choose when to engage the KERS system in an automated mode by achieving the desired amount of braking with a combination of the KERS system and front friction brakes.

Figure 9:
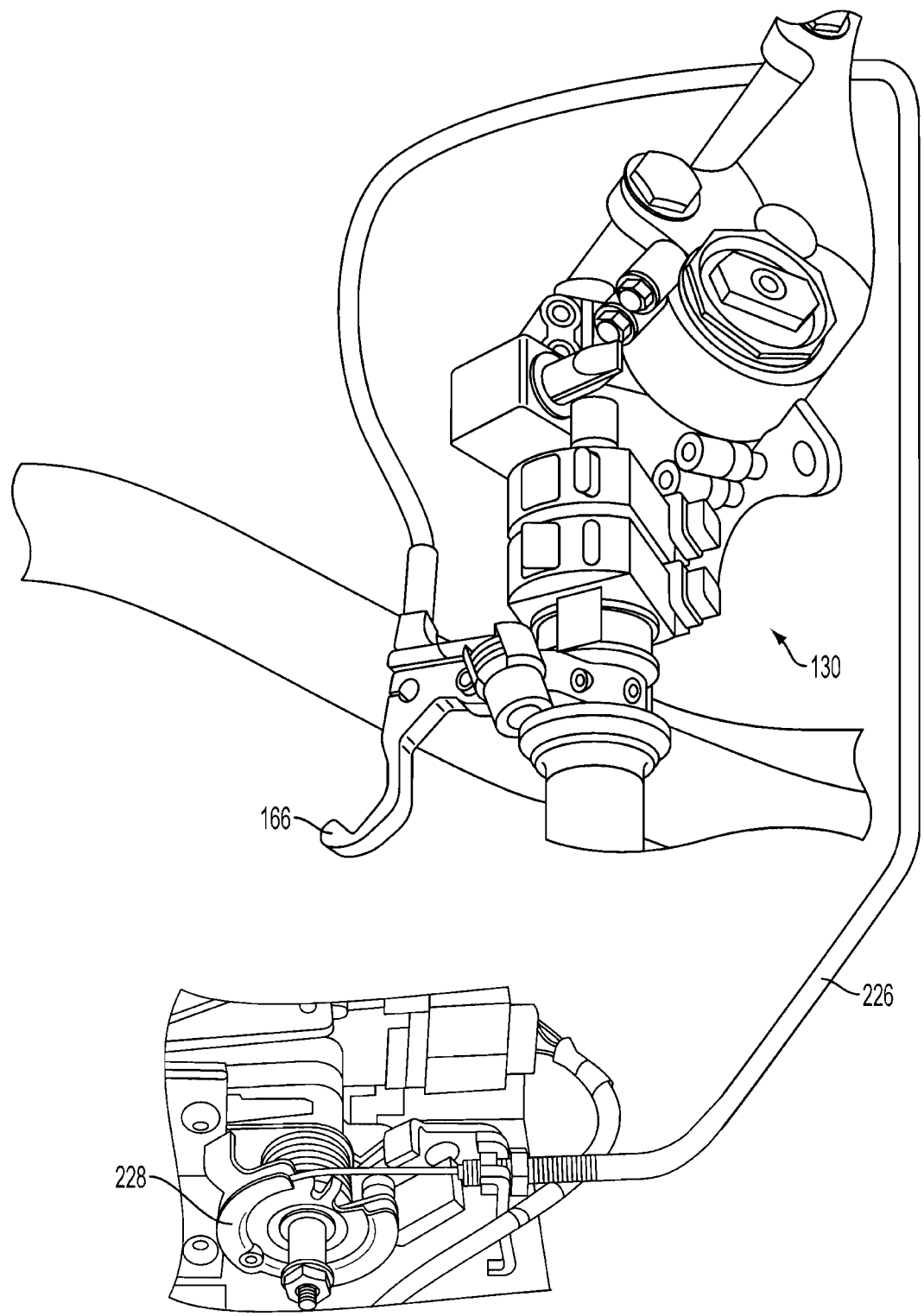
FIG. 9 is a view of a KERS system control device in the form of a rider-operated KERS brake lever and position sensor.

An exemplary embodiment of a KERS brake lever and KERS position sensor is provided in FIG. 9. In this embodiment, the KERS brake lever 166 is connected to a KERS position sensor 230 by way of a steel cable 226 and a rotary cam with a return spring 228. In an alternative embodiment the position sensor may be provided on the handlebar, proximate the KERS brake lever 166. In an exemplary embodiment, the KERS position sensor may be designed to send a signal from 0 to 5 V to the ECU based on the amount of pressure the rider exerts on the KERS brake lever 166. In other words, the KERS position sensor may be designed to send 0V when the KERS brake lever is not being operated and as high as a 5V signal to the ECU when the KERS brake lever is fully squeezed.

In one exemplary embodiment the throttle position sensor is designed similarly to the KERS position sensor. In other words, the throttle on the handlebar is connected to a throttle position sensor by way of a cable and a rotary cam with a return spring. The throttle position sensor then sends a signal to the ECU based on the degree of twist of the throttle on the handlebar.

An engine control unit (ECU) may be used to control and monitor the operation of the motorcycle. The ECU can detect and control the load that a KERS system provides to the electrical accumulator and thus prevent damage to the electrical accumulator due to over charging. The ECU can also control the braking done by the disc brakes in the front wheel for a comprehensive "brake-by-wire" solution. As described in more detail below, the ECU may be designed to receive a series of information such as speed, electrical accumulator voltage, remaining length of the trip, lean angle and other such information collected by a series of sensors located on the motorcycle and/or inputted by the rider. Based on such information, the ECU may then determine the appropriate level of regenerative torque to apply to the electric motor.

It should be recognized that various designs of control units and sensors can be used and thus no particular design should be viewed as limiting. In one embodiment, a series of inertial sensors and/or chassis sensors feed information to an ECU. In an exemplary embodiment, the ECU may be connected to a motor controller and to a rider dashboard display. The connection between the ECU and the motor controller may be accomplished by way of a user-configurable controller-area network bus 194 (CAN network bus). The motor controller may be designed to communicate with the electrical accumulator and with the electric motor. Additional sensors may also be connected to the motor to improve operational control. In an alternative embodiment, the ECU and motor controller may be combined into a single device thus avoiding the need for using CAN networks. In such an embodiment, the single ECU/motor controller device would perform all the functions of the ECU and motor controller described herein. CAN network busses may also be used to connect the ECU to other components on the vehicle such as, for example, the rider dashboard display, a global positioning system (GPS), data acquisition system, and other similar types of electronics.

Figure 10A:
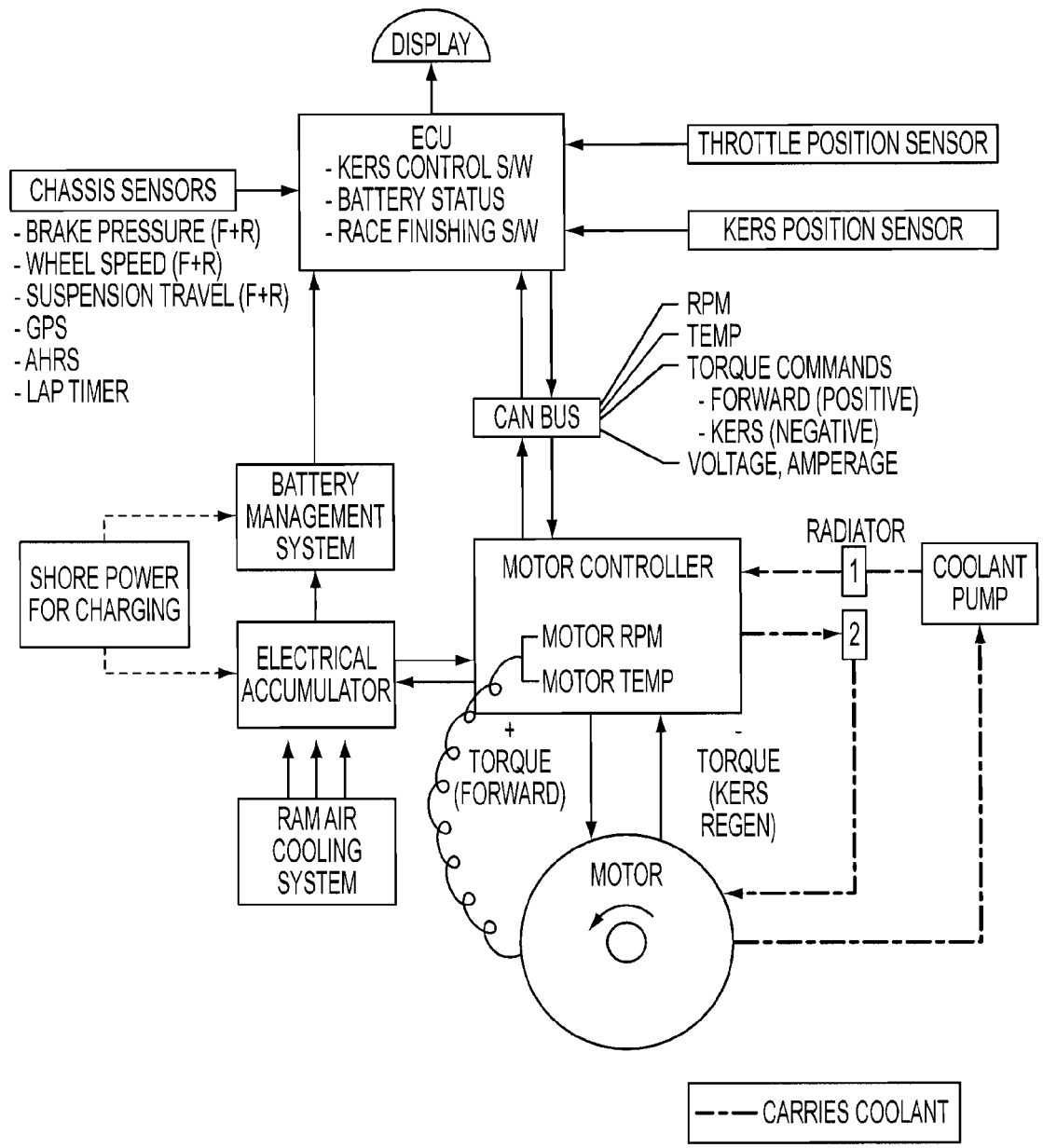
FIG. 10A is a block diagram showing the major components and signal flow on a KERS system equipped motorcycle in accordance with an exemplary embodiment.

An exemplary flowchart of the interconnection between the ECU, motor controller, rider dashboard display, and various sensors is provided in FIG. 10A. In this embodiment, the ECU is shown to receive information from the chassis and inertial sensors that measure one or more of the following: speed of the vehicle, front and back brake pressure, front and back wheel speed, front and back suspension travel, GPS information such as position of the vehicle relative to its intended destination, lap timer, attitude heading and reference system (AHRS). The AHRS is able to provide information relating to the position of the bike relative to a reference plane such as the horizon, for example lean angle and tilt. In addition to the information from the chassis sensors, the ECU also receives information from a KERS position sensor, a throttle position sensor, a battery management system and the motor controller.

Based on the information received, the ECU can then determine the appropriate KERS control, state of the electrical accumulator, and calculate a race finishing algorithm. In determining the appropriate KERS control, by taking into account the full set of conditions, the ECU may also be designed to override the rider's command and limit the amount of regeneration. For example, in a situation in which the vehicle is at large lean angle, which may be communicated to the ECU by the AHRS, the ECU may fully or partially override a rider's command to start regeneration to that would otherwise present a hazardous condition. As discussed above, the ECU outputs signals to the rider dashboard display and the motor controller and in some embodiments, the ECU may generate other outputs.

The ECU may be made to communicate with the rider dashboard display and the motor control with the use of CAN networks. The information shared between the ECU and motor controller may include revolutions per minute (RPM), temperature, voltage, amperage, positive torque command for acceleration, and regenerative braking torque commands for regeneration by the KERS system.

The motor controller is also not limited to a particular design. In an exemplary embodiment, the motor controller has a 500 Amp input current limitation, however, more or less powerful control units may be employed. As stated above, the motor controller, based on the information received from the motor, electrical accumulator, and/or the ECU, controls the torque in the motor and thus the energy regenerated by the motor.

As shown in FIG. 10A, in addition to the ECU, the motor controller is also connected to the electrical accumulator and to the electric motor. The motor controller monitors the temperature and RPM of the electric motor and based on the commands from the ECU, initiates positive torque or regenerative braking torque in the electric motor.

Figure 10B:
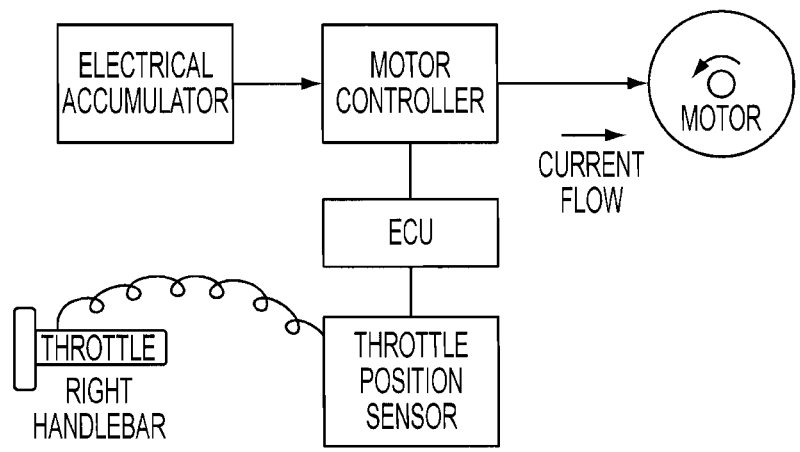
FIGS. 10B-10C are block diagrams showing the two basic modes of operation of a KERS system equipped motorcycle in accordance with an exemplary embodiment; current flowing from the electrical accumulator to the motor to propel the vehicle, and current flowing from the motor back to the electrical accumulator for recharging during braking.
Figure 10C:
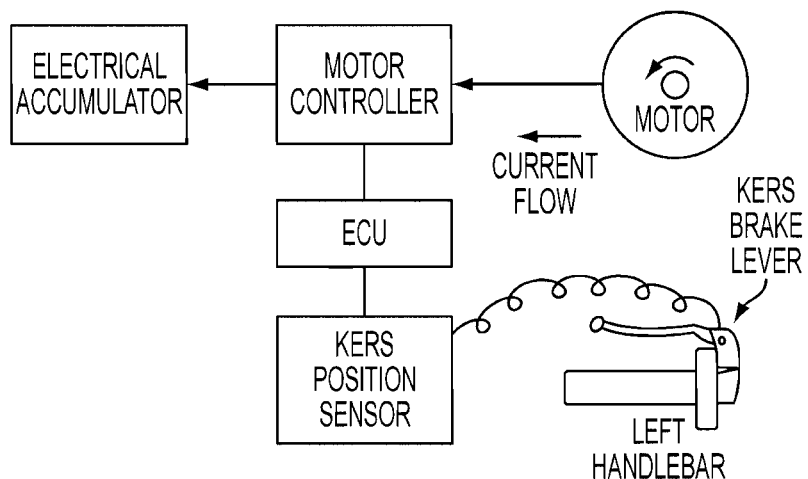

To prevent damage to the motor controller and electric motor, an exemplary embodiment may also be equipped with a coolant system. An exemplary coolant system may include two radiators and a coolant pump. In the example shown in FIG. 10, a coolant pump forces a coolant fluid to circulate through a first radiator, the motor controller, a second radiator, and the electric motor.

The electrical accumulator may include any type of rechargeable electrical accumulator. Exemplary rechargeable electrical accumulators include batteries. Various battery or battery packs may be used. Preferably the batteries used will be light weight and highly efficient. The type of battery used depends on the type of vehicle being constructed, i.e. a street vehicle or a racing vehicle among other factors such as cost and size. Other exemplary rechargeable electrical accumulators are capacitors that can be constructed in various ways. In addition to being connected to the motor controller, the electrical accumulator is also connected to the battery management system that, as explained above, feeds information to the ECU. The electrical accumulator and the battery management system may also be equipped with a shore power component that may be used for charging. An exemplary shore power component would be a plug designed to connect to an external power source to power an of-board battery charger. Additional sensors may also be employed in the shore power and battery charging components to monitor the state of the electrical accumulator, such as temperature, individual cell voltage, and current fed to the charger. Finally, to prevent the electrical accumulator from overheating, it is preferable to also include a cooling system, such as a ram air cooling system that can provide for forced air convection to cool the electrical accumulator. The ram air cooling system may include ducts that extend from the front of the motorcycle where they collect high pressure air and extend to where the electrical accumulators are located.

During operation the user will operate the throttle to accelerate and the KERS brake lever during braking. As shown in exemplary FIG. 10B, when the rider operates the throttle, the throttle position sensor sends a signal to the ECU. Based on the signal from the throttle position sensor, along with one or more other signals such as speed of the vehicle, ramp profile, maximum allowable motor RPM, and maximum torque table, the ECU determines the amount of torque required by the electric motor to achieve the desired acceleration. The ECU then may output a signal to the motor controller to power the electric motor and initiate the required torque to accelerate the speed of the vehicle. To the extent a smoother transition into acceleration mode is desired, the ECU may adjust the generation of torque based on the speed of the vehicle and achieve an almost seamless transition into acceleration. The motor controller powers the electric motor to generate the required torque using the energy from the electrical accumulator. During this operation, therefore, the energy stored in the electrical accumulator may decrease.

During deceleration, instead, in an exemplary embodiment the rider would operate a control device such as the KERS brake lever. As shown in exemplary FIG. 10C, when the rider operates the KERS brake lever, the KERS position sensor sends a signal to the ECU. Based on the signal from the KERS position sensor, along with one or more other signals such as speed of the vehicle, ramp profile, and speed of the front wheel, the ECU determines the amount of regenerative torque in Nm to initiate in the electric motor. The ECU may then output this regenerative torque command to the motor controller, which initiates regenerative braking torque in the electric motor to decelerate the vehicle while regenerating power for the electrical accumulator. In order to achieve a smoother transition from acceleration to regeneration mode, the motor controller may also be commanded by the ECU to initially initiate a torque in the electric motor to match the speed of the front wheel and then to effectuate regenerative braking torque in accordance with the command from the ECU once the speeds are matched. As the motor applies the regenerative braking torque it regenerates electricity that the motor controller can then send to the electrical accumulator. As such, during this operation energy in the electrical accumulator may be restored.

As explained above, operation of the KERS brake lever may in effect decelerate the motorcycle. As such, use of the KERS system may act as a braking system. Upon operation by the rider, the KERS brake lever may provide a linear signal to the ECU. Using an unaltered linear signal output from the KERS brake lever, however, may make it difficult for the rider to manually control the application of KERS system. In other words, if the KERS brake lever were to be squeezed too suddenly, a linearly correlated regenerative braking torque command may result in an undesired abrupt braking that may result in locking of the front wheel and loss of control. To soften the onset of the regenerative braking command, which may be desirable when the KERS brake lever is squeezed abruptly, the ECU may be designed to output a non-linear response despite a linear input from the KERS position sensor.

Figure 11:
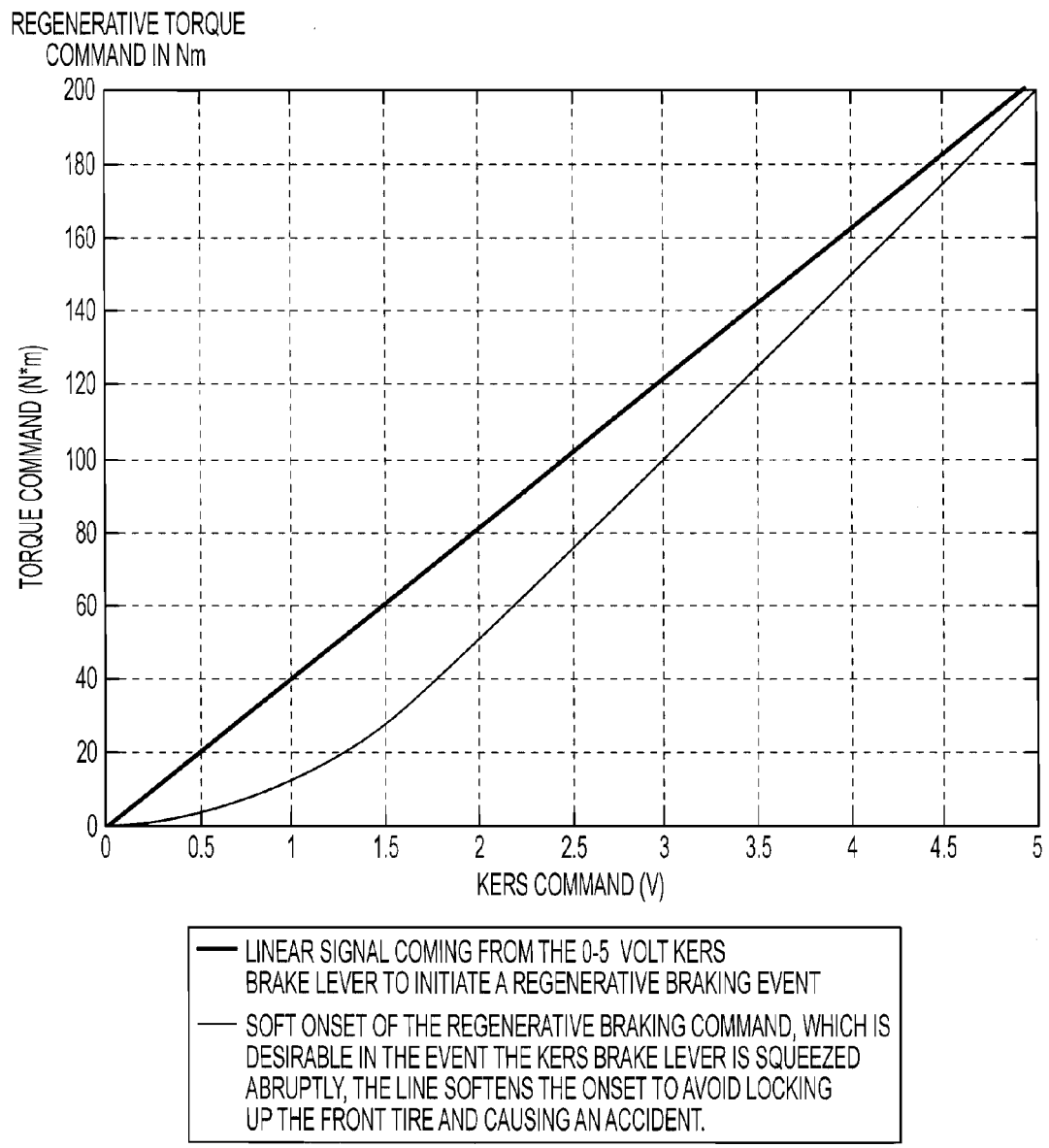
FIG. 11 is a graph showing a direct correspondence between a rider operated KERS brake lever/position sensor and a regenerative torque command; also shown is an alternative soft onset feature to avoid sending abrupt braking torque to the front wheel via the KERS brake lever.

A comparative example of the operation of a vehicle in which an ECU outputs a linear vs. non-linear regenerative torque command is shown in FIG. 11. A plot of the regenerative torque command versus the command from two 0 to 5 V KERS position sensors is provided in FIG. 11. As shown, when the KERS brake lever is fully squeezed and the KERS position sensor sends a 5 V signal to the ECU in both the linear and non-linear models the maximum regenerative torque command in Nm will be the same, i.e. 200 Nm. However, at a 1.5 V command, in a linear model the regenerative torque command for a linear model is 60 Nm while for a non-linear model it is approximately 28 Nm. Accordingly, using the non-linear model, at 1.5 V KERS position sensor command, the rider would experience half as much braking force than a rider using a linear model.

An advantage of the KERS system in accordance with exemplary embodiments is the ability to model its operation to obtain superior performance from an electrical accumulator as well as to determine the suitability of a candidate electrical accumulator for use with a front wheel KERS system based on how the electrical accumulator will respond under extreme charge and discharge cycles. This may be achieved by modeling the operation of the KERS system based on a given set of conditions that reflect a desired vehicle performance and by testing the electrical accumulator using a set of calculated current levels and durations for a set of desired duty cycles from a series of discharge and energy recovery events. An exemplary embodiment demonstrating how the operation of a KERS system may be modeled after a set of given conditions is provided below in conjunction with FIGS. 12A and 12B.

Figure 12A:
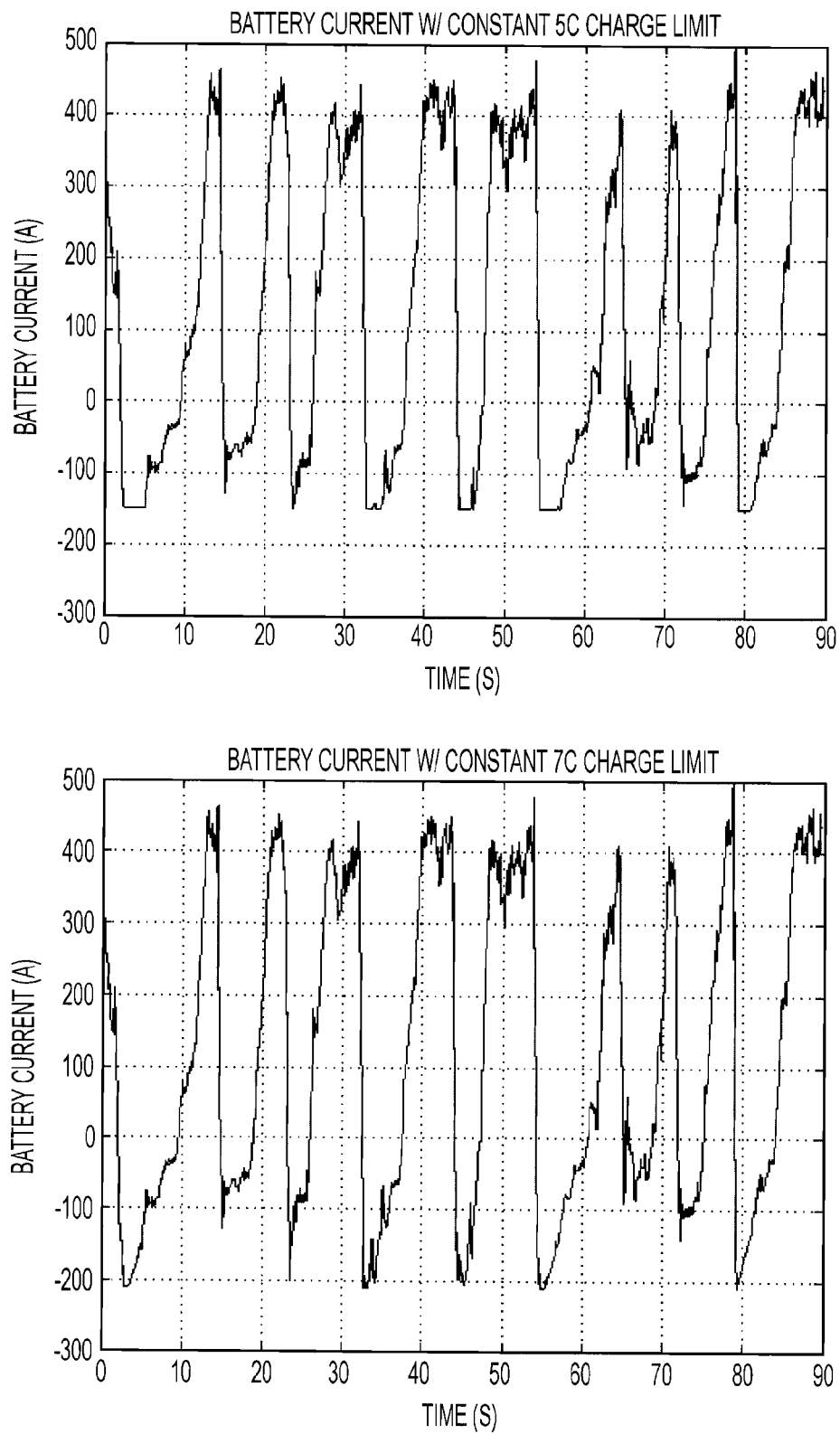
FIG. 12A is series of two plots showing the kinetic energy recovery charge and discharge current profile over the course of one representative lap of a representative racetrack.

FIG. 12A is series of two plots showing the charge obtained using a KERS system and discharge current profile over the course of one representative lap of a representative racetrack. The positive numbers on the Y-axis above zero represent current in amps that will be drawn from the electrical accumulator during acceleration with a scale of zero to 500 amps. The negative numbers on the Y-axis below zero represent current in amps that will be generated by the KERS system under braking with a scale of zero to −300 amps of regeneration. It should be noted that the charge and discharge current profile reflects the conditions of the racetrack, such as its layout, length, elevation, topography, as well as the desired performance of the vehicle such as lap time, desired speed and acceleration. These and other conditions, upon which a current profile in accordance with an exemplary embodiment described herein is generated, may be collected experimentally or from other commercially available sources.

Both plots have the same peak discharge currents of approximately 450 amps during acceleration events. The top plot shows the KERS system current profile if a KERS system limit of 5 C is imposed on the motor controller, for example by an ECU. For an exemplary electrical accumulator comprised of a 30 Ah battery pack, a KERS system current limit of 5 C results in a 150 amp KERS system charge limit (30 Ah×5 C=150 Amps), which can be seen in this plot as the KERS braking events are truncated at the −150 mark on the graph. It may be desirable for a person practicing the invention to impose such KERS system limits in order to avoid overcharging the electrical accumulator, to reduce the stress on the mechanical or hydraulic KERS system components transmitting energy from the front wheel, or for other reasons.

The bottom plot shows the KERS system current profile if a KERS system limit of 7 C is imposed on the motor controller. For an exemplary electrical accumulator comprised of a 30 Ah battery pack, a KERS system current limit of 7 C results in a 210 amp KERS system charge limit (30 Ah×7 C=210 Amps). It may be desirable for a person practicing the invention to impose such KERS system limits in order to avoid overcharging the electrical accumulator, to reduce the stress on the mechanical or hydraulic KERS system components transmitting energy from the front wheel, or for other reasons. Note that very little truncation is seen on the bottom plot indicating that if the rider continues to duplicate similar braking events such as during a race, a KERS system charge limit of 7 C or 7.5 C would be appropriate and this is the maximum level of regeneration for this exemplary rider on this exemplary track that could be expected by a person practicing the invention.

Figure 12B:
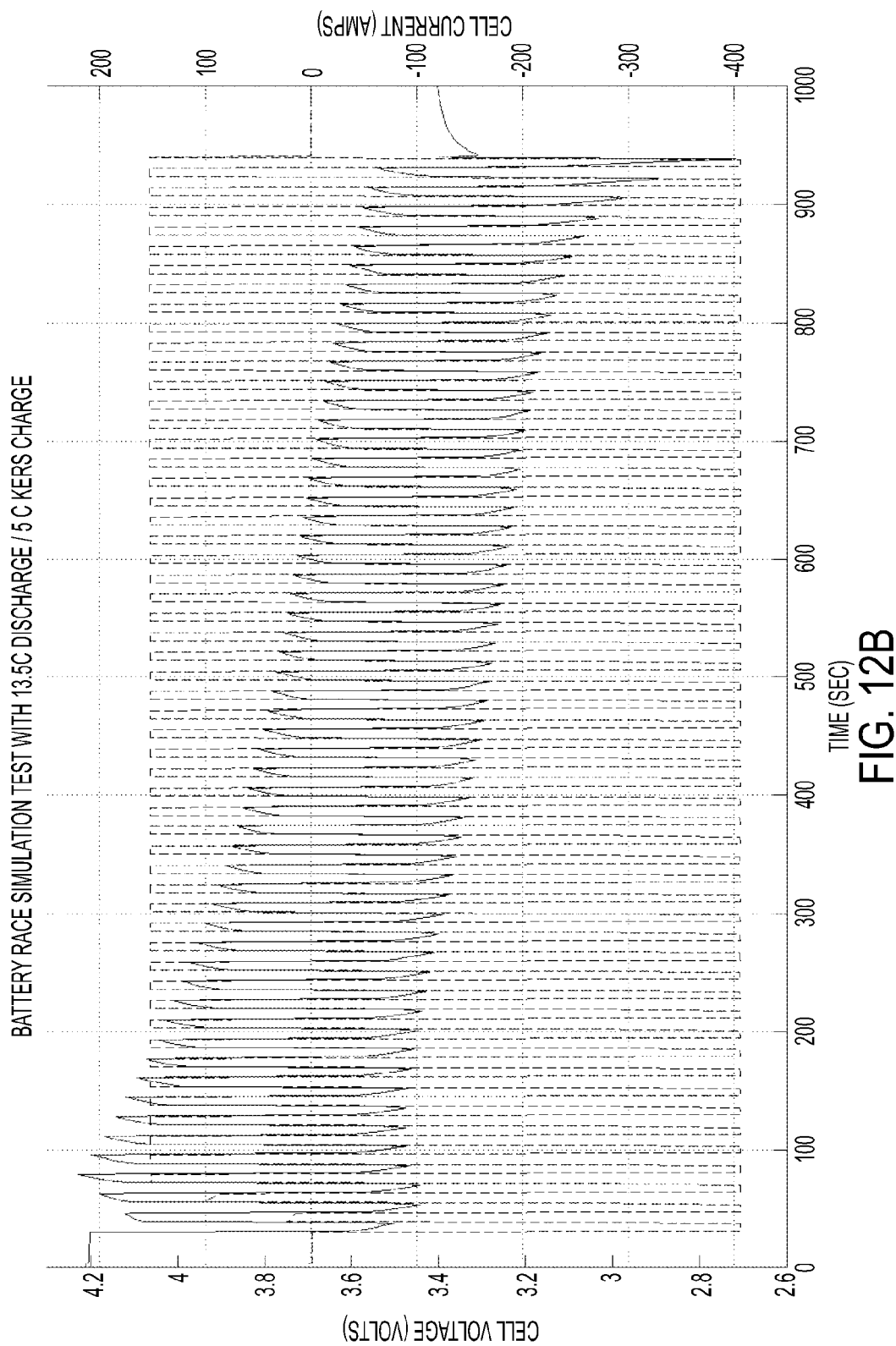
FIG. 12B is a plot resulting from a race simulation test performed on a candidate electrical accumulator, in this case a lithium-ion polymer battery cell.

FIG. 12B is a plot resulting from a race simulation test performed on a candidate electrical accumulator, in this case a lithium-ion polymer battery cell having a capacity of 30 Ah, a maximum voltage of 4.2 VDC, a nominal voltage of 3.7 VDC, and a minimum cell voltage of 2.7 VDC. Lithium-ion polymer cells are known to be capable of very high discharge currents, but may catch on fire or explode if care is not taken during charging. Since a KERS system in accordance to exemplary embodiments may deliver significant charging energy to the electrical accumulator during the operation of a KERS system equipped motorcycle, it is desirable to understand how a candidate electrical accumulator such as a battery cell will respond when subjected to a continuous barrage of charge and discharge cycles, often in rapid succession.

Accordingly, the inventors have designed numerous tests to simulate the conditions that a candidate battery would be subjected to on a motorcycle equipped with a KERS system in accordance with exemplary embodiments described herein. In an exemplary test, the data collected from an exemplary race track, such as the data from FIG. 12A herein, is used to construct a protocol of charge and discharge cycles and their hold times that a candidate battery cell must be able to endure. The results of this test inform a person of critical areas such as whether a battery pack including one or more of the candidate battery cells will operate safely without fire, whether the battery cell will complete a certain race distance while outputting a certain power level, how long the charge in the battery cell can be expected to last based on certain discharge and KERS system regeneration levels, as well as additional information such as battery cell temperatures.

In the exemplary test of FIG. 12B, a candidate battery cell was fully charged to 4.2 VDC, subjected to alternating cycles of discharge at 13.5 C (405 Amps) with a hold time of 5.9 seconds, followed by a KERS system charge at 5 C (150 Amps) with a hold time of 6.75 seconds. These alternating discharge/charge cycles were continued until the voltage of the battery cell reached the minimum voltage of 2.7 VDC.

The battery cell voltage is seen in FIG. 12B as solid lines, and the alternating discharge/charge cycles are seen as dashed lines representing amps. From this plot, it can be appreciated that when exposed to a series of non-stop discharge/charge cycles at high current levels, the candidate battery cell provided the requested energy for a period of between 15~16 minutes before the cell voltage spiked down to the minimum voltage of 2.7 VDC. Without the benefit of the KERS system regeneration provided, the battery cell would quickly become discharged, reaching the minimum voltage of 2.7 VDC in much less time than the 15~16 minutes observed in the exemplary test of FIG. 12B.

Figure 13:
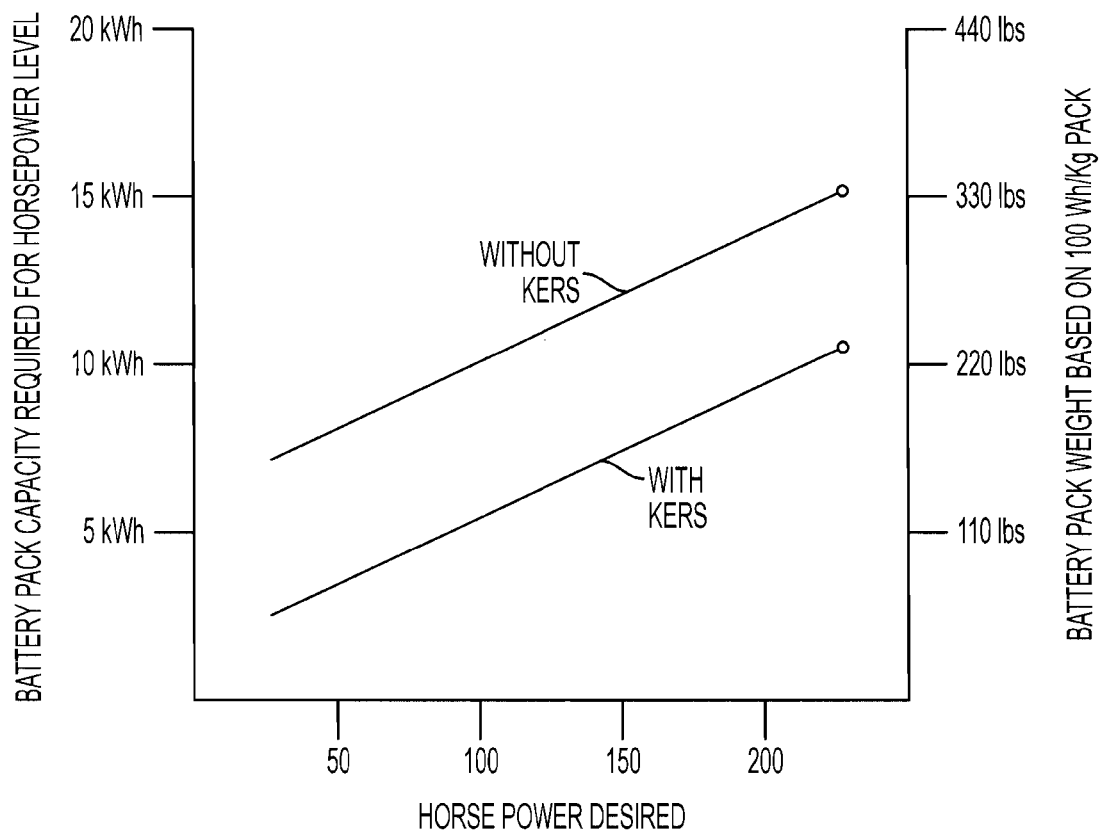
FIG. 13 is a graph showing the reduced weight and capacity of an electrical accumulator such as a battery pack when a KERS system is used with a motor of a certain horsepower level.

FIG. 13 is another plot depicting an advantage that a KERS system in accordance with exemplary embodiments provides for a motorcycle relative to an identical motorcycle without a KERS system. Using a battery pack with a power to weight performance level of 100 Wh/Kg (average for lithium-ion battery packs currently available in the art), a person practicing the invention may easily determine from FIG. 13 the battery pack capacity that will be required for a desired horsepower level in order to complete a fixed length event such as an electrical motorcycle race. From this plot, it can easily be appreciated that for a given horsepower level, the KERS system according to exemplary embodiments allows the use of a much lower capacity battery pack providing an associated weight reduction over an identical, non KERS system, motorcycle of approximately 100 lbs weight savings.

Figure 14:
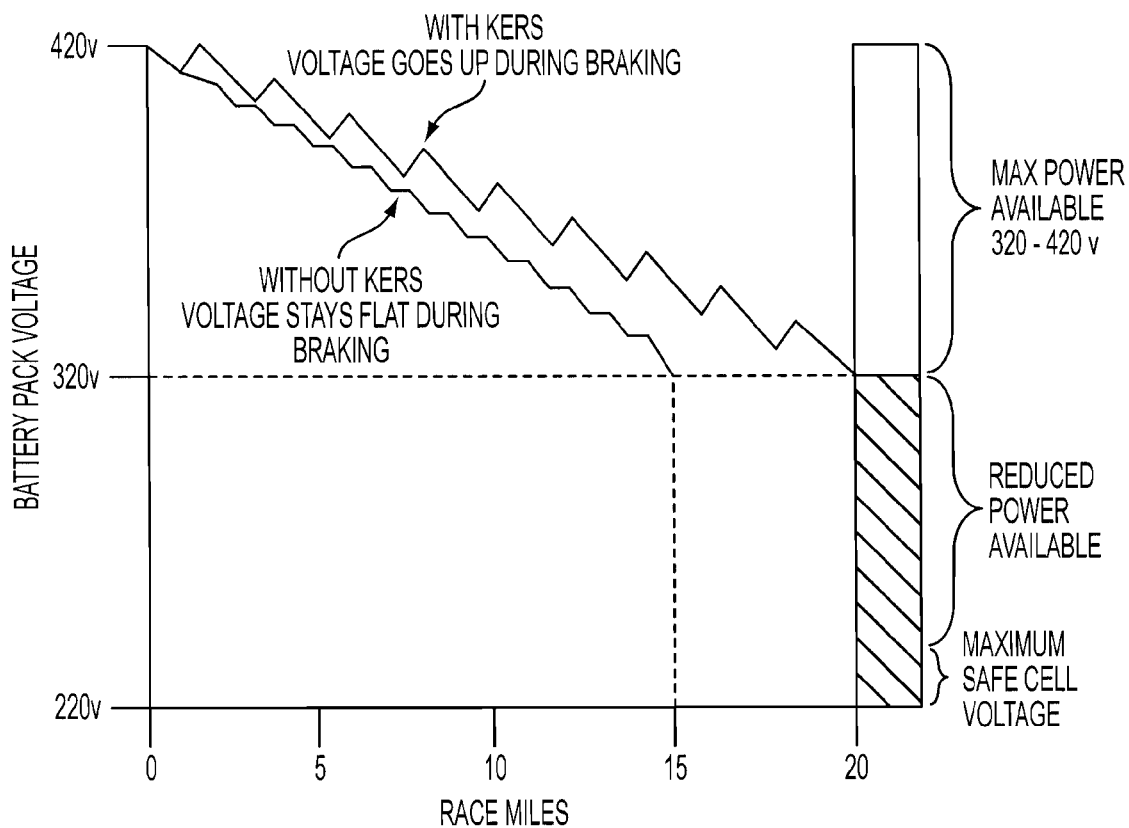
FIG. 14 is a graph showing the effect of a KERS system on maintaining a higher electrical accumulator charge level during use (such as during a race); during braking, the KERS system equipped motorcycle experiences rises in voltage, while the same motorcycle without a KERS system sees flat voltage during braking and is quickly depleted prior to the end of the race.

FIG. 14 is another plot depicting an advantage that the KERS system in accordance with exemplary embodiments may provide for a motorcycle relative to an identical motorcycle without a KERS system. Electric motor controllers typically specify maximum and minimum voltage ranges within which they can deliver maximum power from a connected electric motor. Below the minimum max power voltage (320 VDC in this exemplary embodiment), the electric motor controller and electric motor may continue to operate and make power, but at a reduced level. Using an exemplary battery pack providing a voltage range of 420 VDC fully charged, it can easily be appreciated that while the motorcycles with and without a KERS system start at the same initial voltage, the motorcycle with a KERS system ("the KERS motorcycle") experiences a voltage rise during each braking event, whereas the motorcycle without a KERS system ("the non-KERS motorcycle") experiences flat voltage during each braking event. Accordingly, the non-KERS motorcycle quickly reaches the minimum voltage level and cannot complete an exemplary race of 20 miles, while the KERS motorcycle completes the race at maximum power. Although references are made to race tracks and race performance, it can be appreciated that significant application and advantages may also be obtained to non-racing motorcycles in a wide variety of operating conditions.

Figure 15:
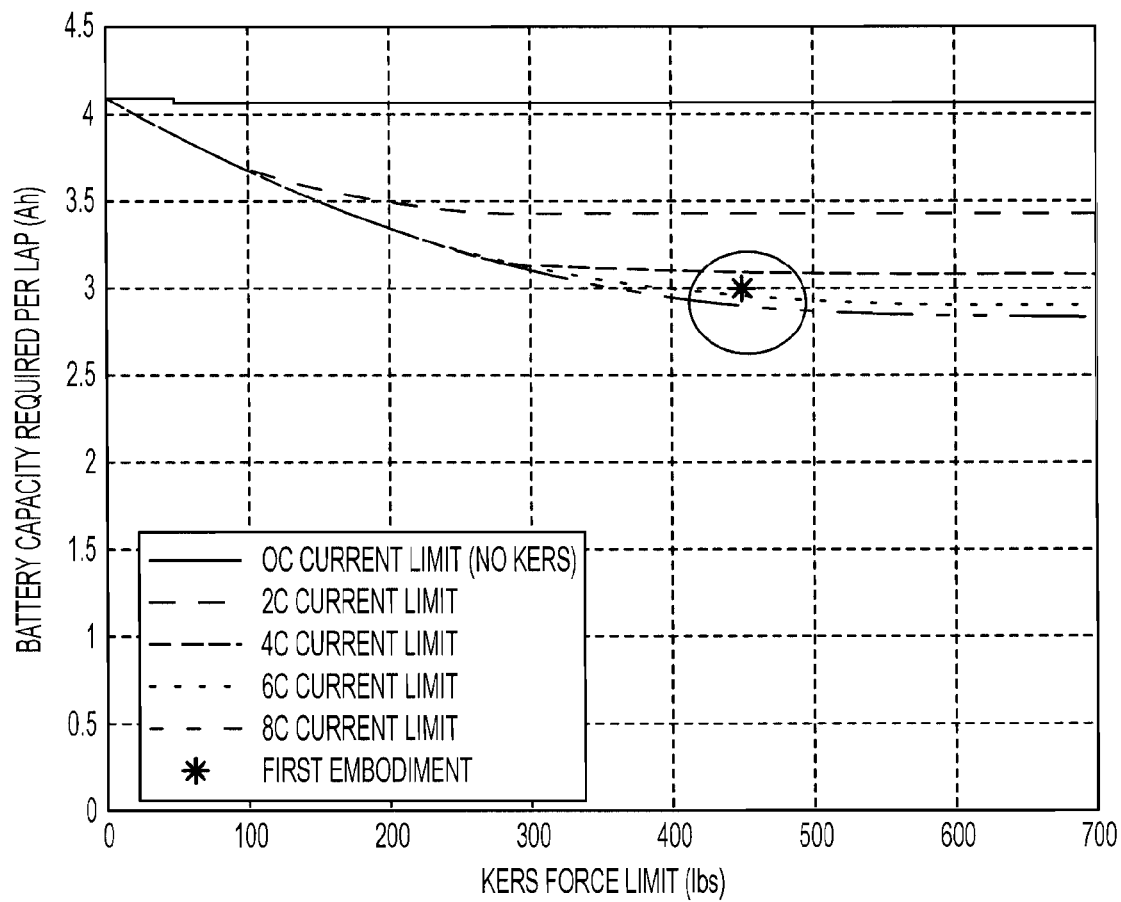
FIG. 15 is a graph showing the effect that different amounts of KERS system force taken from the front wheel along with the KERS system regeneration charge limit has on the amount of electrical accumulator capacity required for a particular journey (in this case, one lap of an exemplary race track).

FIG. 15 is another plot depicting an advantage that the KERS system in accordance with exemplary embodiments may provide for a motorcycle relative to an identical motorcycle without a KERS system. In this plot, an exemplary race is broken down to a single lap to facilitate analysis of battery pack capacity savings. An exemplary embodiment is depicted by the asterisk symbol "*" on the plot. In this embodiment, a mechanical KERS system has been designed with the capability of transferring 450 lbs of braking force from the front wheel (X-axis), and when combined with a KERS Current Limit of approximately 5 C, results in the need of a battery pack capacity of 3 Ah per lap (Y-axis). Compared with an identical non-KERS motorcycle requiring 4.1 Ah per lap, a savings of 1.1 Ah per lap, or a 13.2 Ah total battery pack reduction for an exemplary 12-lap electric motorcycle race is realized. The associated weight savings experienced by the KERS reduced battery pack in this analysis is between 80~130 lbs based on the range of commercially available lithium-ion batteries in the art.

Figure 16A:
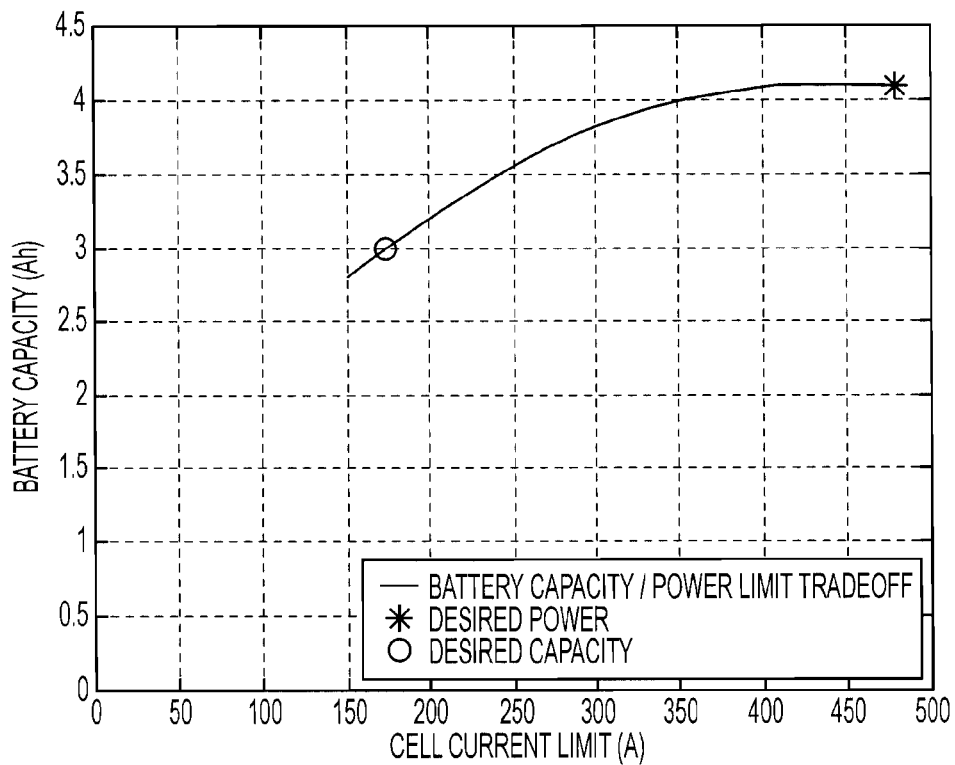
FIGS. 16A-16B are a series of graphs showing how much power reduction is required for a non KERS system equipped motorcycle to complete a particular journey (in this case, one lap of an exemplary race track) that a KERS system equipped motorcycle could complete using full power.
Figure 16B:
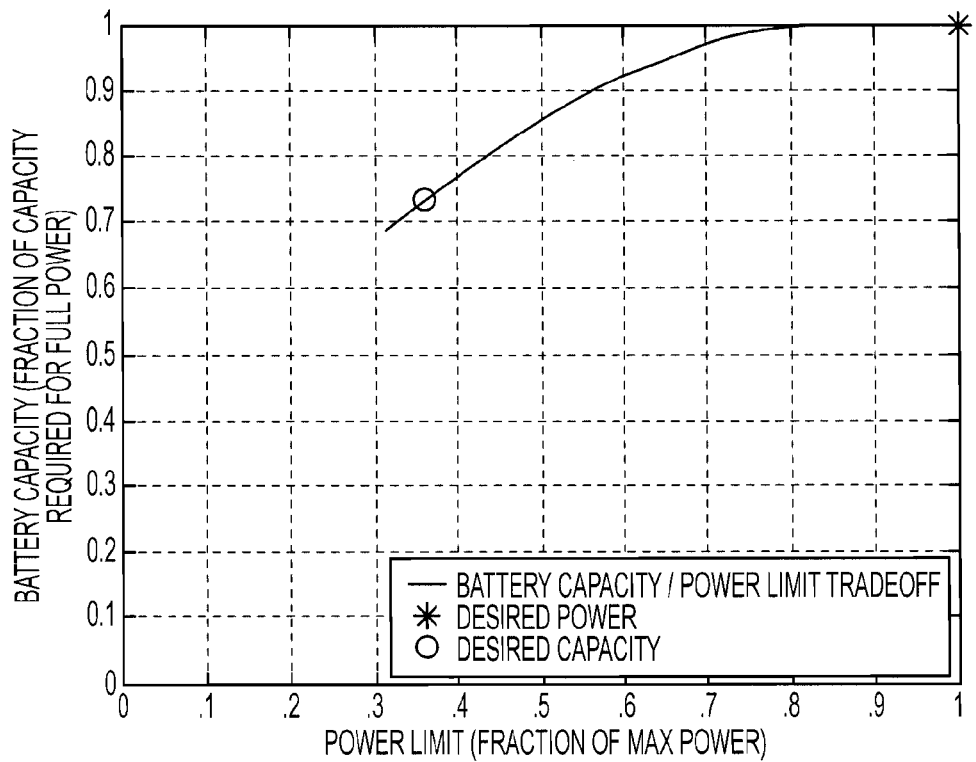

FIG. 16 is another plot depicting an advantage that the KERS system in accordance with exemplary embodiments may provide for a motorcycle relative to an identical motorcycle without a KERS system. The top plot shows that for an exemplary desired power level of 194 horsepower shown by the asterisk "*" (approx 486 amps on the X-axis), a non-KERS motorcycle would require a battery pack capacity of 4.1 Ah per lap (y-axis), whereas the KERS motorcycle requires a capacity of only 3 Ah per lap. Referring then to the bottom plot, if the non-KERS motorcycle were fitted with a battery pack having a capacity of only 3 Ah per lap (i.e. 73% on the Y-axis of the full capacity 4.1 Ah pack), a horsepower limit would need to be imposed to limit the maximum power to 35% (X-axis) of the available power (from 194 horsepower down to 68 horsepower) in order for a non-KERS motorcycle to travel the same distance as the KERS motorcycle, such as 12 laps of an electric motorcycle race. Therefore, if a non-KERS motorcycle and a KERS motorcycle both feature the same 3 Ah per lap battery pack and the same electric motor, in order to complete the same 12-lap race, the non-KERS motorcycle must be limited to just 68 horsepower, while the KERS motorcycle can produce 194 horsepower for the entire race distance.

In accordance with the above described embodiments of the front wheel mechanical KERS system for a motorcycle, the transfer of the power from the front wheel to the electrical accumulator may be accomplished through a rigid drive system, at least partially internal to the vehicle frame that enables a full range of steering, that maintains vehicle aesthetics, and prevents rider injury from exposed front wheel drive parts. As discussed previously, the mechanical KERS system may extend along one or both sides of the front wheel. In a preferred embodiment, the mechanical KERS system extends along both sides of the front wheel and is symmetrically aligned along the axis of steering to counterbalance and thus minimize the torque reactions from the rotation of the moving parts.

In an alternative embodiment, the KERS system described above may be used without a front wheel sprag clutch. Using the same mechanical KERS system described above but without a front wheel sprag clutch, the front wheel would in effect be driven by the motor. In so doing, the vehicle may be made to be a two-wheel drive or all wheel-drive vehicle, or even solely a front-wheel drive. In an exemplary embodiment a front-wheel drive or a two-wheel/all-wheel drive vehicle may still be able to regenerate energy in the electrical accumulator during deceleration as describe above. In an exemplary embodiment of a front wheel drive vehicle the rear wheel may be left to free wheel without being operatively engaged to the motor shaft.

Another exemplary embodiment may include a hydraulic energy recovery system ("hydraulic KERS system") fully or partially replacing the above described mechanical KERS system. A hydraulic KERS system in accordance with an exemplary embodiment may also be connected to the front wheel and may be engaged to transfer power from the front wheel to the electrical accumulator by way of the electric motor. A hydraulic KERS system may include at least one hydraulic pump to pump fluid and one hydraulic pump to receive the pumped fluid known as a hydraulic motor. In one embodiment, two gerotors are used, one installed on the front wheel and one connected to the motor shaft. In one embodiment, the gerotor engaged with the front wheel can be used to generate pressure. The pressure is then transferred to a hydraulic motor connected to the motor shaft using a conduit or fluid passageway such as tubing. The hydraulic motor may also comprise a gerotor. The pressure transfer may be accomplished using a liquid such as hydraulic fluid or oil as typically used in gerotors. The hydraulic motor connected to the motor shaft converts the pressure energy transferred from the first gerotor into a load applied to the motor shaft by using the pressure energy to rotate the motor shaft. Upon application of this load to the motor shaft, the motor can then generate electricity upon receipt of a command from the motor controller as explained above with respect to the mechanical KERS system embodiments. The commands and sensors controlling the motor, operation and engagement of the hydraulic KERS system may be similar to those described above in conjunction with the mechanical KERS system. Accordingly, engagement of the hydraulic KERS system may be manual, automatic, or a combination of both.

An advantage derived from using a hydraulic KERS system as described herein is the ability to collect energy from the front wheel without the need of the mechanical gears and shafts described in conjunction with the mechanical KERS system. Accordingly, a hydraulic KERS system may be easier to implement with different vehicle designs than a mechanical KERS system. For example a hydraulic KERS system may be easily employed in motorcycles that do not have a front fork such as, for example, motorcycles that use a hub steering or swingarm style front suspension.

Figure 17A:
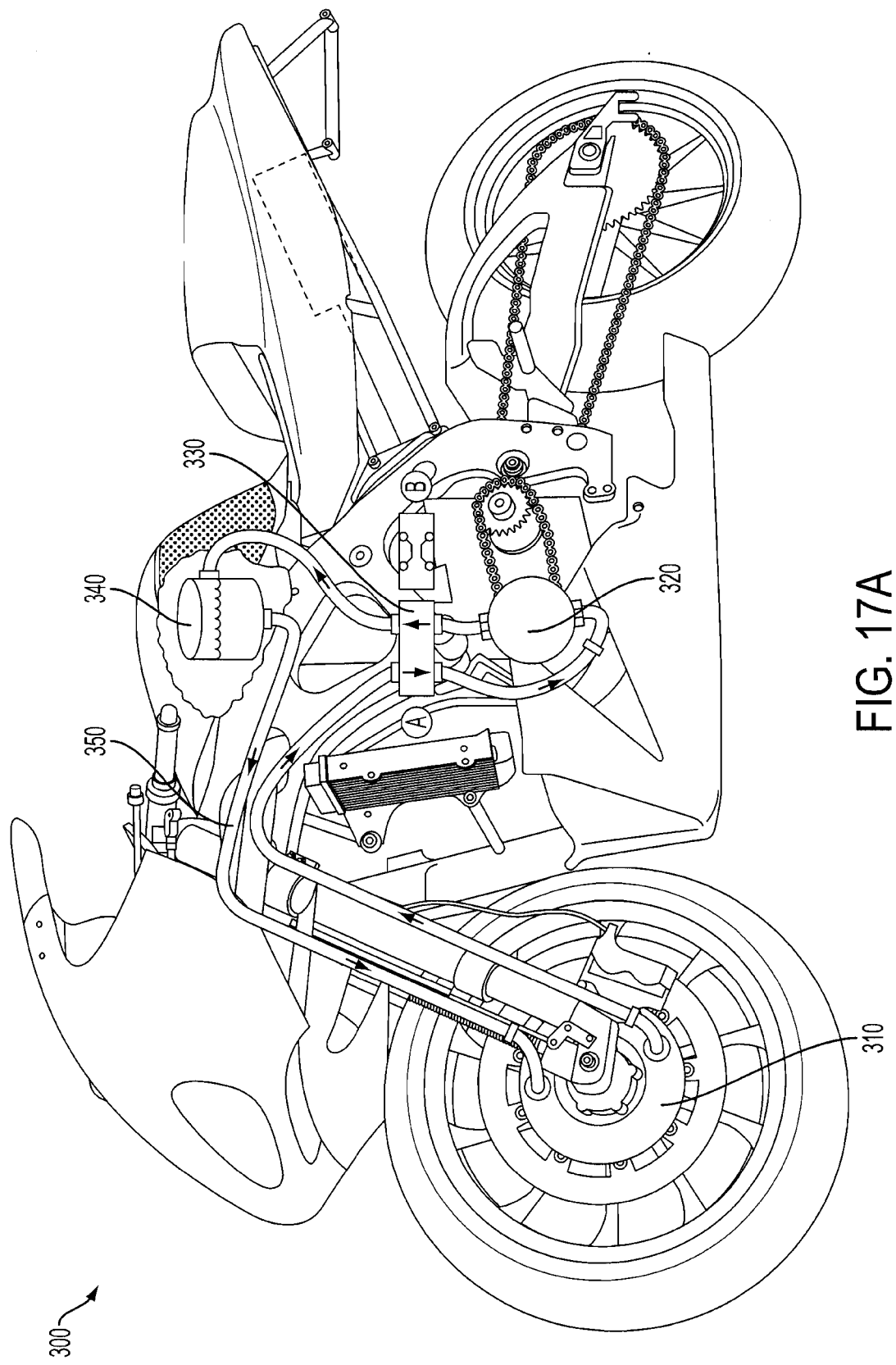
FIG. 17A is a side view of an electric motorcycle equipped with a front wheel hydraulic KERS system in accordance with an exemplary embodiment; a hydraulic pump is located on the front wheel, a hydraulic pump/motor is located on the electric motor shaft, and hydraulic lines, reservoir, and fluid is shown; also shown is a switching valve with two states, A and B.

An exemplary embodiment of the hydraulic KERS system is shown in FIG. 17A. This figure shows a motorcycle 300 equipped with a first hydraulic pump 310 operatively connected to a front wheel, a hydraulic motor 320 operatively connected to the electric motor, a valve 330, a reservoir 340, a conduit or tubing 350.

Figure 17B:
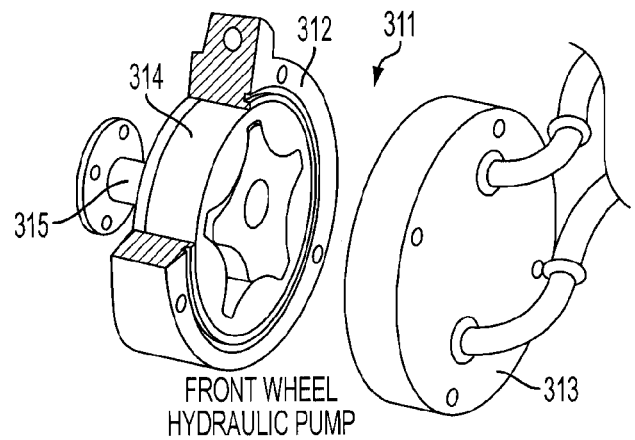
FIGS. 17B-17C is a series of diagrams of a gerotor style hydraulic pump, hydraulic motor, electric motor, drive sprocket.

An exploded view of an exemplary embodiment of the first hydraulic pump 310 is shown in FIG. 17(b). The first hydraulic pump 310 may include a gerotor assembly 311 having a housing 312, made for example of aluminum, a housing cover 313, a gerotor 314, a shaft 315, and tubing 350. The gerotor 314 may be made of any known material, in one exemplary embodiment the gerotor 314 is made of powdered metal. A steel plate may also be inserted between the powdered metal gerotor and the aluminum housing to prevent galling.

As the front wheel spins, it operatively engages and turns front wheel shaft 315 that is connected to gerotor 314. As front wheel shaft 315 turns, it rotates gerotor 314 thereby causing fluid from tubing 350 to be suctioned in from the reservoir 340 and pressured toward hydraulic motor 320. Front wheel shaft 315 and gerotor housing cover 313 are represented as a solid front wheel shaft and solid cover, however, in certain embodiments it may be desirable for the axle of the front wheel 106 to pass through the center of the gerotor pump assembly. In such embodiments, front wheel shaft 315 may be hollow, and the front wheel axle may pass through the center of the front wheel shaft and exit through the center of the gerotor housing cover and be thereto rotatably sealed by the use of one or more o-rings or other suitable sealing devices arranged to seal against a rotating shaft as are known by those skilled in the art of hydraulic systems.

Figure 17C:
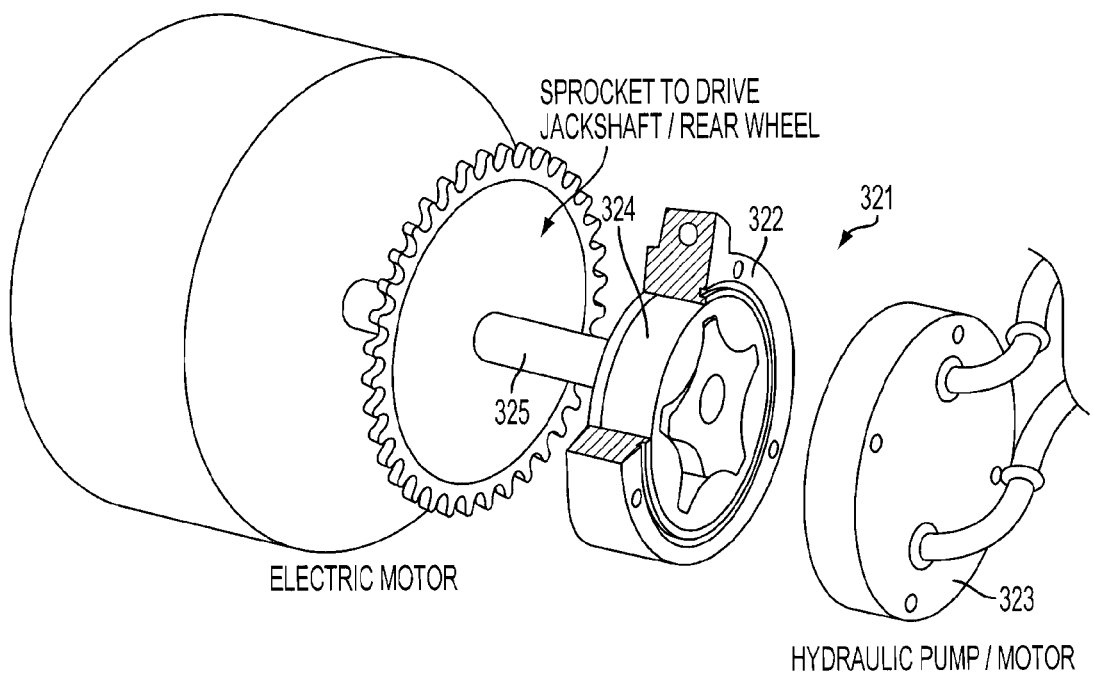

An exploded view of an exemplary embodiment of the hydraulic pump/motor 320 is shown in FIG. 17(c). The hydraulic motor 320 may include a gerotor assembly 321 having a housing 322, made for example of aluminum, a housing cover 323, a gerotor 324, an motor shaft 325, and tubing 350. The gerotor 324 may be made of any known material, in one exemplary embodiment the gerotor 324 is made of powdered metal. A steel plate may also be inserted between the powdered metal gerotor and the aluminum housing to prevent galling.

As the pressurized fluid from the hydraulic pump 310 is received by hydraulic motor 320 from tubing 350, it causes the gerotor 324 to turn. As the gerotor 324 turns it applies a load on the output shaft 325 that is operatively connected to the electric motor. When the load is applied it can be turned into electrical energy by the electric motor. In a hydraulic KERS system, the controls for the electric motor to generate power to recharge the electrical accumulator may be the same as those described above with respect to the mechanical KERS system.

As the pressurized fluid causes the gerotor 324 to turn, it leaves the hydraulic motor 320 by way of tubing 350 and returns to reservoir 340. As shown in FIG. 17(a), the hydraulic KERS system may be engaged and disengaged using, for example, a valve 330. In an exemplary embodiment, valve 330 may be a 2-position valve such as a solenoid operated or a cable operated valve. The 2-position valve may be engaged or disengaged. When the 2-position valve is engaged the tubing 350 allows the fluid to travel from reservoir 340, to first hydraulic pump 310, to hydraulic motor 320 and back to reservoir 340. When the 2-position valve 330 is disengaged, the tubing 350 is effectively split into two allowing fluid to circulate only between reservoir 340 and first hydraulic pump 310, while effectively isolating hydraulic motor 320.

Figure 17D:
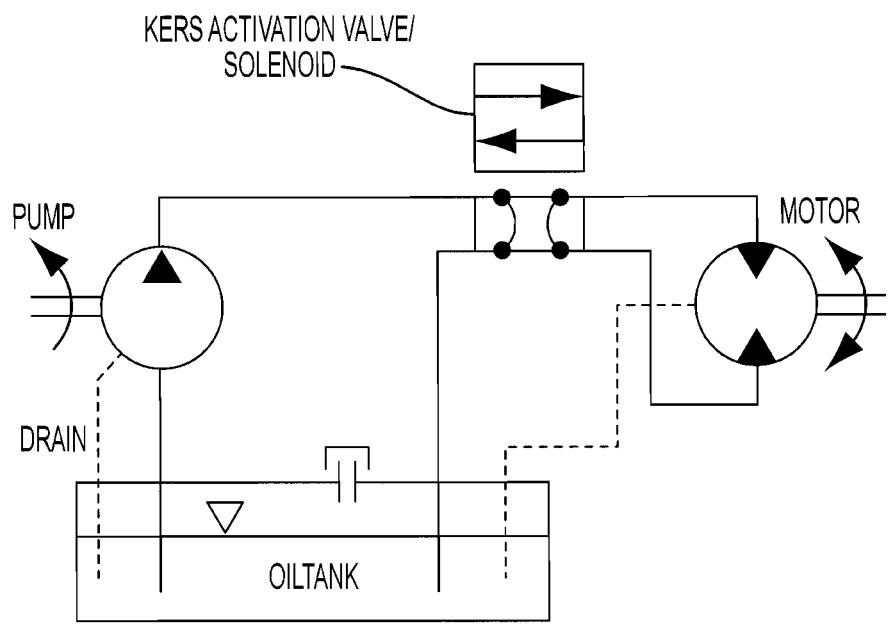
FIG. 17D is a block diagram exemplifying the operation of an hydraulic KERS system.

An exemplary diagram of the operation of the hydraulic KERS system is further illustrated in FIG. 17(d). As explained above, this diagram shows the flow of fluid from the reservoir to the first hydraulic pump operatively connected to the front wheel, to the hydraulic pump/motor operatively connected to the electric motor and finally back to the reservoir.

Like the mechanical KERS system described previously, the hydraulic KERS system may be operated manually, automatically, or a combination of manual and automatic operation. Similar to the mechanical KERS system, a manual operation may include a switch or lever for example on the handlebars for the rider to operate. For example, valve 330 may be a cable operated valve, where the cable is directly connected to the lever on the handlebar. Valve 330 may be operated, for example to switch between the A position and the B position indicated in FIG. 17(a).

The hydraulic KERS system provides many of the same advantages described above with respect to the mechanical KERS system. Importantly, the hydraulic KERS system in accordance with an exemplary embodiment is connected to the front wheel and thus is able to generate substantial energy during operation of a motorcycle. This in turn allows for the use of lighter weight electrical accumulators and extended vehicle range. A hydraulic KERS system may also be easily designed to accommodate for the telescoping action of the front fork by the implementation of flexible tubing. Finally, like the mechanical KERS system described previously, the hydraulic KERS system may be designed to power the front wheel by configuring the front hydraulic pump and the hydraulic motor to both function as hydraulic pump/motors. The structure of a hydraulic pump/motor is similar to that of a the hydraulic pump 310 and hydraulic motor 320 discussed above with the exception that they are able to function in both manners to receive and transfer power between them. By using two hydraulic pump/motors, it would be possible to transfer power to and from the front wheel thereby allowing for KERS system regeneration during deceleration while also achieving front wheel drive or two-wheel/all-wheel drive.

In yet another embodiment, a mechanical KERS system may be used as described previously, except with the addition of a dual clutch pack differential mounted on the motor shaft. The dual clutch pack may allow for additional control of the engagement and disengagement of the motor shaft with the front wheel KERS system and with the rear wheel. A dual clutch pack may be used in combination with the sprag bearings on the front wheel and jackshaft. Alternatively, the dual clutch pack may be used without the sprag bearings, thereby providing for full control of the engagement and disengagement of the motor shaft with the KERS system and with the rear wheel.

Figure 18:
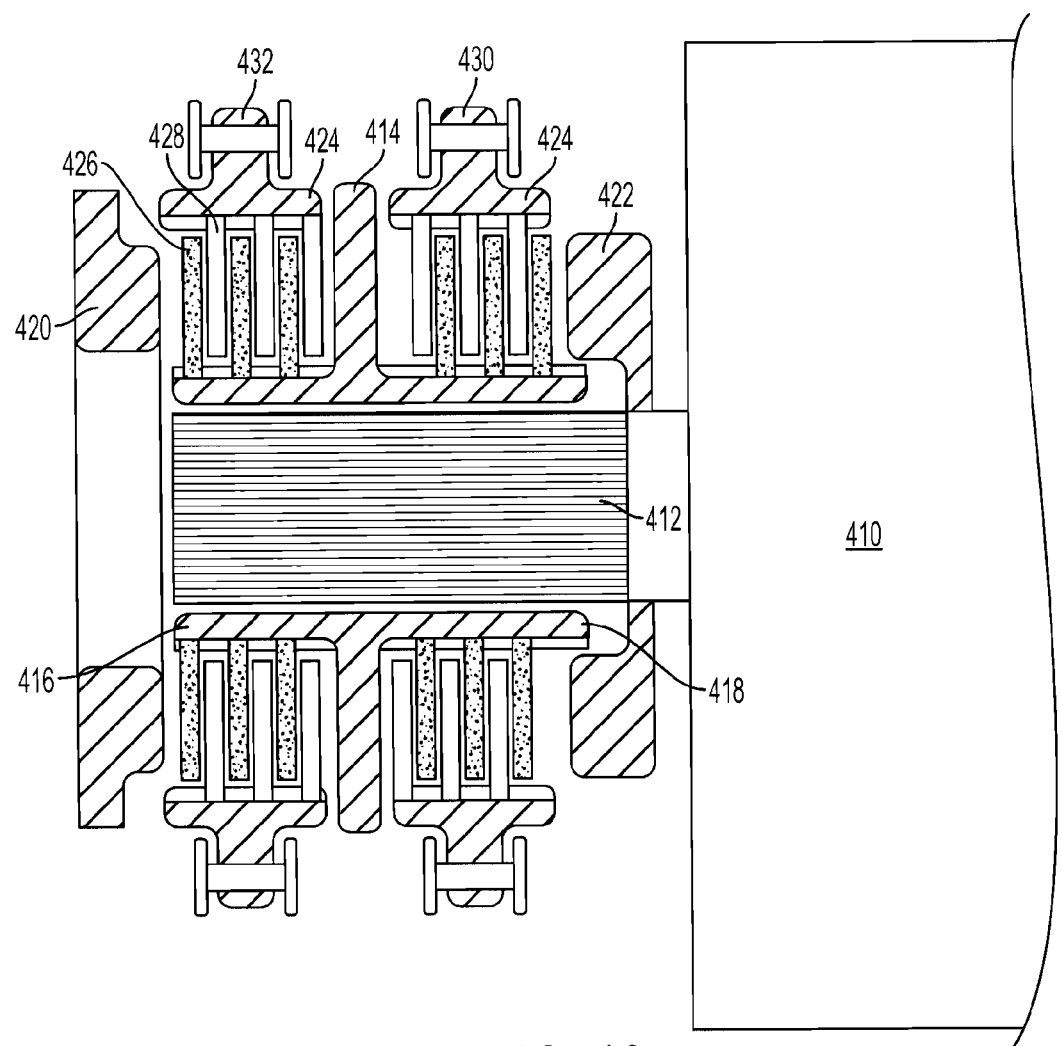
FIG. 18 is a section view diagram of a dual clutch pack differential splined to the output/input shaft of an electric motor used to vary the transfer of energy between the electric motor, and the front and rear wheels by the use of clutch packs and pressure plates.

An exemplary embodiment of a dual clutch pack differential is shown in FIG. 18. This figure provides a cross-sectional view of a dual clutch pack differential mounted on the motor shaft. FIG. 18 shows, an electric motor 410 with an motor shaft 412. The motor shaft may be splined to engage with an inner clutch basket 414. The outer edge of the inner clutch basket 414 includes a collar portion 416 that may be designed to allow for the position of the inner clutch basket 414 relative to the position of an outer pressure plate 420 and of an inner pressure plate 422. The inner edge of the inner clutch basket 414 may further be similarly provided with a collar portion 418 designed to aid the positioning of the inner clutch basket 414 relative to the outer pressure plate 420 and inner pressure plate 422.

Opposite the inner clutch basket 414 may be an outer clutch basket 424. Outer clutch basket 424 may be connected to rear wheel sprocket 432 and motor KERS sprocket 430, which are each engaged with chains as described previously. A series of clutch friction plates 426 and clutch metal discs 428 may be provided between the inner clutch basket 414 and the outer clutch basket 424. Clutch friction plates 426 and clutch metal discs 428 may be splined to either the inner clutch basket 414 or the outer clutch basket 424.

According to this exemplary embodiment, when the mechanical KERS system is to be engaged, the inner pressure plate 422 can be fixed in its position while the collar portion 416 of inner clutch basket 414 may be pressed toward the pressure plate 422 thereby pressing against the clutch friction plates 426 and clutch metal discs 428 operatively engaged with motor KERS sprocket 430. In so doing, the mechanical KERS system connected to sprocket 430 is operatively engaged to the motor shaft. Alternatively, when power is to be transferred to the rear wheel, the outer pressure plate 420 is pressed against the inner clutch basket 414, which is may be held fixed in its position by collar portion 416 thereby pressing against the clutch friction plates 426 and clutch metal discs 428 operatively engaged to rear wheel sprocket 432. In so doing, power is transferred to the rear wheel by way of sprocket 432. It should also be recognized that if desired, the outer pressure plate 420 may be pressed inwards against the pressure plate 422 thereby pressing against all of the clutch friction plates 426 and clutch metal discs 428 operatively engaged to both the motor KERS sprocket 430 and the rear wheel sprocket 432. This would result in the mechanical KERS system and the rear wheel being simultaneously engaged with the motor shaft. This may be desired to achieve simultaneous power transfer from the electric motor to the front and rear wheels.

Figure 19:
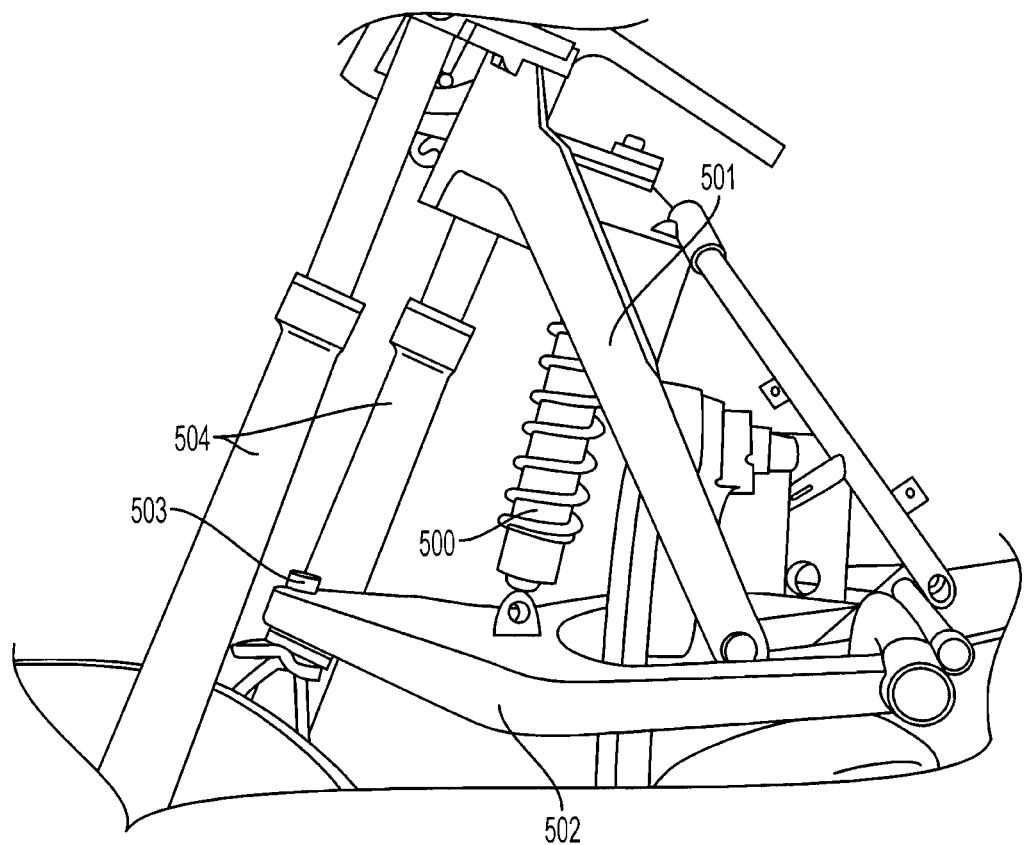
FIG. 19 is a view of an alternate front suspension arrangement to the commonly used front forks; exemplary embodiments may include any type of front suspension for a motorcycle.

FIG. 19 provides an additional exemplary embodiment in which suspension for the front wheel may be provided outside the front fork such as used in a BMW Telelever®. In this exemplary embodiment, suspension 500 extends between the vehicle frame 501 and bottom member 502 connected to the steering mechanism at location 503. In this exemplary embodiment the front fork 504 may still be a telescopic front fork as described above. Front fork 504 may also still contain additional suspension elements. The KERS system apparatus, mechanical or hydraulics, used in this exemplary embodiment would be the same as those described above in conjunction with the other exemplary embodiments.

Exemplary embodiment shown in FIG. 19 may also be an optional design that eases the construction of a mechanical or hydraulic KERS system within the front fork. As described above, a KERS system may be formed along the front fork or alternatively inside the front fork. A KERS system apparatus would be the same as described above in conjunction with the other exemplary embodiments with the exception of being enclosed within the front fork as opposed to being adjacent to the front fork. As shown in FIG. 19, because the suspension may be provided outside the front fork, more room would be available inside the front fork making the implementation of a KERS system within the front fork easier because there would not be any need to share the space with suspension elements such as springs and damping valves.

In yet another exemplary embodiment, a mechanical KERS system may also be implemented for use in motorcycles and other vehicles that use a hub steering or swingarm style front suspensions. In such exemplary embodiments (not shown) where the front swingarm remains fixed relative to a pivoting front wheel, a universal joint may be mounted on the front wheel to allow power transfer from the front wheel while providing for a full range of steering. The universal joint may be connected to either a sprocket or other gear. In one embodiment, the sprocket is mounted on swingarm side of the universal joint and may operatively engage a chain that extends and operatively engages to the motor shaft like the KERS drive chain as described above. Alternatively, a universal joint on the front wheel may be connected to a gear that can transfer power to a drive shaft similar to the KERS front shafts 170 or 180 described above that can extend inside of the vehicle frame extending along the front swingarm. Inside the vehicle frame, the drive shaft may be designed to directly engage a gear box similar to gear box 160 described above that is also connected to a KERS drive chain operatively engaged to the motor shaft. Like the exemplary embodiments previously disclosed, two drive shafts may also be used instead of a single drive shaft. In such an alternative embodiment, each drive shaft would operatively engage the front wheel on opposite sides of the front wheel axle each using a universal joint to allow the front wheel to pivot during steering while still transferring energy to the electric motor.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A method of regenerating energy in an electrical accumulator comprising:
    collecting energy from a kinetic energy recovery system ("KERS") operatively connected to a front wheel of a two-wheel or three-wheel vehicle;
    transferring energy collected from the front wheel along a steering head to an electric motor by applying a load on a motor shaft;
    generating electricity using the load applied on the motor shaft.

2. The method of claim 1, wherein the kinetic energy from the front wheel is mechanically transferred from the front wheel to the motor shaft.

3. The method of claim 1, wherein the kinetic energy from the front wheel is transferred from the front wheel to the motor shaft using hydraulics.

4. The method of claim 1, wherein generating electricity further comprises:
collecting data from one or more sensors on the vehicle;
determining an appropriate level of regenerative torque based on the collected information;
initiating said regenerative torque in the motor.

5. The method of claim 4, wherein collecting data further comprises at least one of:
measuring a state of charge of at least one electrical accumulator on the vehicle;
measuring a speed of at least one wheel;
measuring a tilt angle of the vehicle; and
measuring the position of the vehicle with respect to a destination.

6. A method comprising:
calculating an amount of charge current obtainable from a front wheel kinetic energy recovery system ("KERS");
calculating a current level and duration for a desired duty cycle for an electrical accumulator for at least one discharge event and one energy recovery event; and
testing the electrical accumulator using the calculated current level and duration from each event.

7. The method of claim 6, further comprising:
generating a current profile based on the testing; and
limiting charging of the electrical accumulator by the KERS using the current profile via a motor controller.

8. The method of claim 7, further comprising:
limiting discharging of the electrical accumulator using the current profile via a motor controller when approaching a minimum voltage level of the electrical accumulator.

9. The method of claim 7 wherein the current profile reflects at least one of the following: elevation, topography, route time, desired speed, and desired acceleration.

10. The method of claim 1, wherein the transferring energy step further comprises:
applying the load on the motor shaft using a chain or gear.

11. The method of claim 10, wherein the motor shaft is substantially rigid and comprises a light weight material.

12. The method of claim 5, further comprising limiting the initiated regenerative torque based on the tilt angle of the vehicle.

13. The method of claim 1, further comprising:
detecting a charge level of the electrical accumulator; and
using a friction braking system when the detected charge level of the electrical accumulator is in a state of high charge.

14. The method of claim 13, wherein the friction braking system and the KERS simultaneously provide braking force to slow the vehicle.

15. The method of claim 13, wherein a proportion of braking force provided by the friction braking system and the KERS is determined by a control unit.

16. The method of claim 15, wherein the control unit comprises an engine control unit.

17. The method of claim 15, wherein the control unit comprises a motor controller.

18. The method of claim 13, wherein a proportion of braking force provided by the friction braking system and the KERS is determined by an operator of the vehicle.

19. The method of claim 1, further comprising:
allowing the front wheel and a rear wheel of the vehicle to spin at different speeds to thereby create a dead zone.

20. The method of claim 19, wherein the dead zone provides for a minimum gear ratio between the rear wheel and a motor, the dead zone expressed by:

$$(r_r/r_m) \geq (r_f/r_m) \times (R_r/R_f)_{max} \times ((1+s_f)/(1+s_r))_{max}$$

wherein the variable "R" represents wheel radius, "r" represents effective gear pitch radius, and "s" represents slip ratio,
wherein the subscript "r" represents rear wheel, "f" represents front wheel, and "m" represents motor.

21. The method of claim 19, wherein the dead zone provides for a minimum gear ratio between the front wheel and the motor, the dead zone expressed by:

$$(r_f/r_m) \leq (r_r/r_m) * (R_f/R_r)_{min} * ((1+s_r)/(1+s_f))_{min}$$

wherein the variable "R" represents wheel radius, "r" represents effective gear pitch radius, and "s" represents slip ratio,
wherein the subscript "r" represents rear wheel, "f" represents front wheel, and "m" represents motor.

22. The method of claim 19, wherein the dead zone allows the front and the rear wheels to free wheel in one direction.

23. The method of claim 19, further comprising:
the motor engaging a rear wheel sprag bearing while a front wheel sprag bearing is disengaged and overrunning during acceleration.

24. The method of claim 19, further comprising:
the motor disengaging a rear wheel sprag bearing and engaging a front wheel sprag bearing during deceleration.

25. The method of claim 19, further comprising:
disengaging a rear clutch and engaging a front clutch during braking.

26. A method comprising:
collecting data from one or more sensors, the data including a position of a vehicle relative to an intended destination, tilt angle, and state of charge of an electrical accumulator;
determining appropriate kinetic energy recovery system ("KERS") control based on at least the position of the vehicle, tilt angle, and electrical accumulator state of charge, the appropriate KERS control allowing the vehicle to reach the intended destination; and
initiating torque commands in a motor based on the determined KERS control thereby controlling the motor.

27. The method of claim 26, wherein the torque commands override at least one input received from an operator of the vehicle.

28. The method of claim 3, wherein hydraulic pressure is generated by a hydraulic pump driven by the front wheel.

29. The method of claim 28, wherein the hydraulic pump is a gerotor.

30. The method of claim 28, wherein the hydraulic pressure is conveyed via tubing to a second hydraulic pump connected to the motor shaft.

31. The method of claim 30, wherein the second hydraulic pump is configured as a hydraulic motor.

32. The method of claim 11, further comprising:
controlling engagement and disengagement of the motor shaft with the KERS and rear wheel with a dual clutch pack differential.

33. The method of claim 32, wherein the dual clutch pack differential is mounted on the motor shaft.

* * * * *